United States Patent
Sato et al.

(10) Patent No.: US 12,049,996 B2
(45) Date of Patent: Jul. 30, 2024

(54) VEHICLE LIGHTING FIXTURE

(71) Applicant: Ichikoh Industries, Ltd., Isehara (JP)

(72) Inventors: Yoshiro Sato, Isehara (JP); Alejandro De-Arriba, Isehara (JP); Takaaki Tsuchiya, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 18/354,303

(22) Filed: Jul. 18, 2023

(65) Prior Publication Data

US 2023/0358387 A1     Nov. 9, 2023

Related U.S. Application Data

(62) Division of application No. 17/758,033, filed as application No. PCT/JP2020/046977 on Dec. 16, 2020, now abandoned.

(30) Foreign Application Priority Data

Dec. 27, 2019   (JP) ................................ 2019-238324

(51) Int. Cl.
*F21S 45/70*     (2018.01)
*B60Q 1/26*     (2006.01)
(Continued)

(52) U.S. Cl.
CPC .............. *F21S 45/70* (2018.01); *B60Q 1/268* (2013.01); *B60Q 1/28* (2013.01); *B60Q 1/30* (2013.01);
(Continued)

(58) Field of Classification Search
CPC .......... F21S 45/70; B60Q 1/268; B60Q 1/28; B60Q 1/302; B60Q 1/30; B60Q 1/50; F21Y 2115/10
See application file for complete search history.

(56) References Cited

U.S. PATENT DOCUMENTS 3,848,974 A    11/1974   Hosking et al.
5,709,453 A *   1/1998   Krent .................... F21S 43/247
                                                            362/100
(Continued)

FOREIGN PATENT DOCUMENTS

CN            107631266 A     1/2018
DE   10 2017 002 920 A1     9/2018
(Continued)

OTHER PUBLICATIONS

International Search Report mailed on Mar. 2, 2021 in PCT/JP2020/046977 filed on Dec. 16, 2020 (6 pages).
(Continued)

*Primary Examiner* — Thomas M Sember
(74) *Attorney, Agent, or Firm* — Oblon, McClelland, Maier & Neustadt, L.L.P.

(57) ABSTRACT

When light is off, a transparent appearance is obtained, while when the light is on, light is seen through a transparent spot. The present invention includes a light source portion and a reflective portion. The light source portion emits light. The light source portion is disposed at a position shifted with respect to an emitting direction of emitted light from the reflective portion. The reflective portion reflects the light from the light source portion and emits it in a predetermined direction. The reflective portion is constituted by a transparent member with a refractive index at least in a visible light area larger than 1. As a result, in the present invention, the transparent appearance is obtained when the light is off, while the light is seen through the transparent spot when the light is on.

4 Claims, 13 Drawing Sheets

(51) Int. Cl.
  *B60Q 1/28* (2006.01)
  *B60Q 1/30* (2006.01)
  *B60Q 1/50* (2006.01)
  *F21Y 115/10* (2016.01)

(52) U.S. Cl.
  CPC .............. *B60Q 1/302* (2013.01); *B60Q 1/50* (2013.01); *F21Y 2115/10* (2016.08)

(56) References Cited

U.S. PATENT DOCUMENTS

| | | | |
|---|---|---|---|
| 6,637,922 B2 * | 10/2003 | Lee | F21S 41/28 362/216 |
| 2014/0254186 A1 | 9/2014 | Terai et al. | |
| 2015/0124303 A1 | 5/2015 | Dimov | |
| 2016/0003440 A1 * | 1/2016 | Wataya | C09K 11/675 313/503 |
| 2017/0122515 A1 | 5/2017 | Bhakta | |
| 2019/0234581 A1 * | 8/2019 | Iwakura | H01L 25/0753 |
| 2019/0310486 A1 | 10/2019 | Ferri | |

FOREIGN PATENT DOCUMENTS

| | | |
|---|---|---|
| EP | 1 528 527 A1 | 5/2005 |
| EP | 3 355 664 A1 | 8/2018 |
| EP | 3 527 426 A1 | 8/2019 |
| JP | 59-174942 U | 11/1984 |
| JP | 60-108557 U | 7/1985 |
| JP | 1-109141 A | 4/1989 |
| JP | 8-124408 A | 5/1996 |
| JP | 11-329018 A | 11/1999 |
| JP | 2005-18050 A | 1/2005 |
| JP | 2012-99279 A | 5/2012 |
| JP | 2012-530935 A | 12/2012 |
| JP | 2013-246943 A | 12/2013 |
| JP | 2014-182886 A | 9/2014 |
| JP | 2015-88220 A | 5/2015 |
| JP | 2015-176731 A | 10/2015 |
| JP | 2018-73459 A | 5/2018 |
| KR | 10-2010-0043505 A | 4/2010 |
| WO | WO 2013/134804 A1 | 9/2013 |

OTHER PUBLICATIONS

Office Action issued Jun. 6, 2023, in corresponding Japanese Patent Application No. 2019-238324 (with English Translation), 15 pages.
Partial Supplementary European Search Report issued Sep. 21, 2023, in corresponding European Patent Application No. 20905839. 5, 21 pages.
Extended European Search Report issued Jan. 3, 2024, in corresponding European Patent Application No. 20905839.5, 81 pages.

* cited by examiner

VEHICLE LIGHTING FIXTURE

CROSS-REFERENCE TO RELATED APPLICATIONS

This application is a divisional of U.S. application Ser. No. 17/758,033, filed Jun. 27, 2022, which is a National Stage Application of International Application No. PCT/JP2020/046977 filed on Dec. 16, 2020, which designates the United States, incorporated herein by reference, and which claims the benefit of priority from Japanese Patent Application No. 2019-238324, filed on Dec. 27, 2019, the entire contents of which are incorporated herein by reference.

TECHNICAL FIELD

The present invention relates to a vehicle lighting fixture.

BACKGROUND ART

A vehicle lighting fixture in which a light source portion is not visible when the light is off (OFF) and light from the light source portion is visible when the light is on (ON) is shown in Patent Literature 1, for example.

The vehicle lighting fixture of Patent Literature 1 has an LED disposed within a light emission range of an outer lens so that a light emission direction of the LED is opposite to a light emission direction from the outer lens, and the LED is covered by a third reflector from the front side. In the vehicle lighting fixture of Patent Literature 1, the LED is not visible from the front through the outer lens when the light is off, and when the light is on, the light from the LED is reflected by a first reflector, a second reflector, and a third reflector and passes through the outer lens and is emitted to outside and is visible.

CITATION LIST

Patent Literature

Patent Literature 1: Japanese Patent Laid-open Publication No. 2018-73459

SUMMARY OF THE INVENTION

Problems to be Solved by the Invention

In such vehicle lighting fixtures, it is important to have a transparent appearance when the light is off and that the light can be seen through a transparent part when the light is on.

A problem to be solved by this invention is to provide a vehicle lighting fixture which has a transparent appearance, when the light is off, and when the light is on, light can be seen through the transparent part.

Means for Solving the Problem

The vehicle lighting fixture of this invention is characterized by including a light source portion which emits light and a reflective portion which reflects the light from the light source portion and emits the light in a predetermined direction, in which the light source portion is disposed at a position shifted with respect to a light emission direction of emitted light from the reflective portion, and the reflective portion is constituted by a transparent member whose refractive index at least in a visible light range is larger than 1.

The vehicle lighting fixture of this invention preferably includes a shielding member which blocks the light source portion from a line of sight in a direction opposite to the emission direction of the light emitted from the reflective portion.

In the vehicle lighting fixture of this invention, it is preferable that a lamp housing and a lamp lens forming a light chamber are provided, the light source portion is disposed inside the light chamber, and the reflective portion is disposed outside the light chamber and facing the lamp lens so that the light from the light source portion emitted from the lamp lens to outside of the light chamber is reflected and emitted again in a predetermined direction to the outside the light chamber.

In the vehicle lighting fixture of this invention, it is preferable that the reflective portion constitutes a part of a transparent wall member which forms a cabin.

In the vehicle lighting fixture of this invention, the reflective portion is preferably constituted by at least one plate member.

In the vehicle lighting fixture of this invention, it is preferable that the light source portion has a light source which emits light and an optical substrate which is disposed between the light source and the lamp lens.

In the vehicle lighting fixture of this invention, it is preferable that the optical substrate has a design part provided.

In the vehicle lighting fixture of this invention, it is preferable that the light source portion has a plurality of light sources, each of which can be controlled to be turned on/off.

In the vehicle lighting fixture of this invention, it is preferable that a design member with a design is provided, and that the design member is disposed on a side opposite to a side of a direction in which the reflective portion emits the light from the light source portion with respect to the reflective portion.

The vehicle lighting fixture of this invention is characterized by including an excitation light source which emits excitation light, a light emitting layer which generates photoluminescence by the excitation light emitted from the excitation light source, a lamp housing and a lamp lens which form a light chamber, a reflective portion which is disposed in the light chamber and reflects the photoluminescence from the light emitting layer to the lamp lens side, and an excitation-light blocking member which is disposed between the light emitting layer side and sides of the reflective portion and the lamp lens so as to block the excitation light that does not pass through the light emitting layer in the excitation light, in which the lamp lens is constituted by a colorless light-transmissive member.

In the vehicle lighting fixture of this invention, the excitation-light blocking member is preferably constituted by a member which transmits the photoluminescence and absorbs the excitation light.

In the vehicle lighting fixture of this invention, the excitation-light blocking member preferably has a transmissive part which transmits the photoluminescence and a non-transmissive part which does not transmit the excitation light.

In the vehicle lighting fixture of this invention, it is preferable that an external-light absorbing layer which absorbs light transmitted through the lamp lens from outside the light chamber and entering the light chamber provided on a surface on the side of the light chamber in the lamp housing.

In the vehicle lighting fixture of this invention, it is preferable that a design part is provided in the light emitting layer.

In the vehicle lighting fixture of this invention, the reflective portion is preferably constituted by at least one plate member.

It is preferable that the vehicle lighting fixture of this invention has a plurality of the excitation light sources, and each of the plurality of excitation light sources can be controlled to be turned on/off.

The vehicle lighting fixture of this invention is characterized by including an excitation light source which emits excitation light, a light emitting layer which generates photoluminescence by the excitation light emitted from the excitation light source, a lamp lens, and a reflective portion which is directed to the light emitting layer and an inside of the lamp lens, respectively, and reflects the photoluminescence from the light emitting layer, transmits it through the lamp lens, and emits it to outside of the lamp lens, in which the lamp lens is constituted by a member which absorbs the excitation light.

In the vehicle lighting fixture of this invention, it is preferable that a design part is provided in the light emitting layer.

It is preferable that the vehicle lighting fixture of this invention has a plurality of the excitation light sources, and each of the plurality of excitation light sources can be controlled to be turned on/off.

In the vehicle lighting fixture of this invention, it is preferable that a design member with a design is provided, and that the design member is disposed on a side opposite to the lamp lens side with respect to the reflective portion.

The vehicle lighting fixture of this invention is characterized by including a light source which emits light, a reflective portion which reflects the light from the light source and emits it in a predetermined direction, and an optical substrate which is disposed between the light source and the reflective portion.

In the vehicle lighting fixture of this invention, it is preferable that the optical substrate has a design part provided.

It is preferable that the vehicle lighting fixture of this invention has a plurality of the light sources, and each of the plurality of light sources can be controlled to be turned on/off.

In the vehicle lighting fixture of this invention, it is preferable that a design member with a design is provided, and that the design member is disposed on a side opposite to the lamp lens side with respect to the reflective portion.

Effect of the Invention

With the vehicle lighting fixture of this invention, a transparent appearance can be obtained when the light is off, and when the light is on, the light can be seen through the transparent part.

BRIEF DESCRIPTION OF THE DRAWINGS

FIG. 2 is a rear view of the vehicle showing a state when the light is on.

FIG. 4 is a vertical-sectional view (IV-IV line sectional view in FIG. 2) showing the state when the light is on.

FIG. 5 is a vertical-sectional view (vertical-sectional view corresponding to FIG. 4) of Embodiment 2 of the vehicle lighting fixture according to this invention showing the state when the light is on.

FIG. 8 is a vertical-sectional view showing the state when the light is on.

FIG. 9 is a vertical-sectional view of Embodiment 5 of the vehicle lighting fixture according to this invention showing the state when the light is on.

FIG. 11 is a vertical-sectional view showing the state when the light is on.

FIG. 12 is a vertical-sectional view of Embodiment 7 of the vehicle lighting fixture according to this invention showing the state when the light is on.

FIG. 13 is a vertical-sectional view of Embodiment 8 of the vehicle lighting fixture according to this invention showing the state when light is on.

MODE FOR CARRYING OUT THE INVENTION

Figure 1:
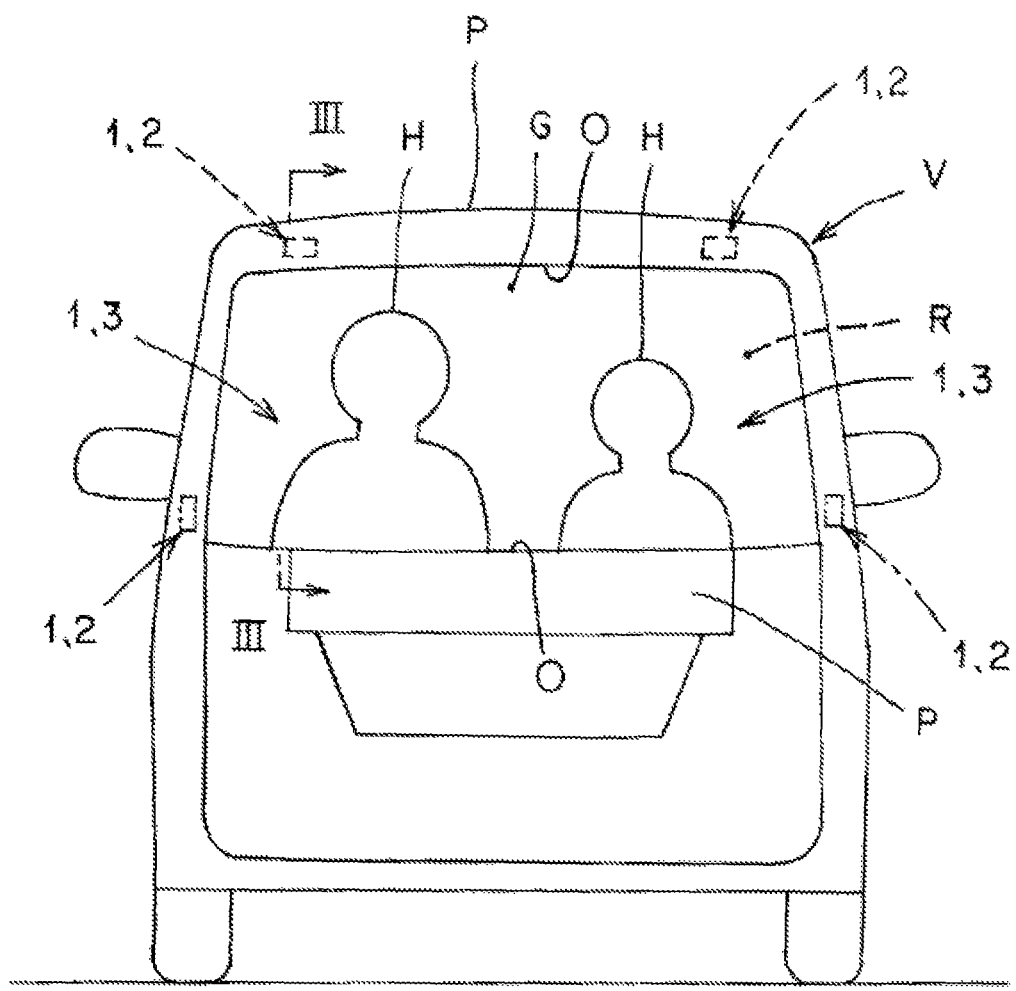
FIG. 1 is a rear view of a vehicle showing a vehicle lighting fixture of Embodiment 1 of this invention when light is off.

Hereinafter, eight examples of embodiments (examples) of a vehicle lighting fixture according to this invention will be described in detail on the basis of drawings. In the description, front, rear, up, down, right, and left denote the front, rear, up, down, right, and left when the vehicle lighting fixture according to this invention is mounted on a vehicle. Note that the drawings are schematic views in which main components are illustrated while illustration of components other than the main components is omitted. In addition, hatching on a part of the components is omitted.

(Explanation of Configuration in Embodiment 1) FIGS. 1 to 4 show Embodiment 1 of a vehicle lighting fixture according to this invention. Hereinafter, the configuration of the vehicle lighting fixture according to Embodiment 1 will be described.

(Explanation of Vehicle V) In FIGS. 1 to 4, the sign V denotes a vehicle. The vehicle V has a cabin R formed by a vehicle body panel P and a window glass G. For example, the vehicle body panel P on a rear part of the vehicle V has an opening O provided. The window glass G is fitted into the opening O. As a result, the cabin R is formed. A person H is on board the vehicle in the cabin R.

Rear combination lamps are mounted on both the and right sides on the rear part of the vehicle V, respectively. Moreover, front combination lamps (not shown) are mounted on both the left and right sides of a front part of the vehicle V, respectively. In addition, other vehicle lighting fixtures (not shown) are mounted outside and inside the vehicle V (inside the cabin R).

(Explanation of Vehicle Lighting Fixture) In FIGS. 1 to 4, the sign 1 denotes the vehicle lighting fixture according to this Embodiment 1. The vehicle lighting fixture 1 is, in this example, a tail lamp that constitutes a rear combination lamp. Note that the vehicle lighting fixture 1 may be a stop lamp or tail/stop lamp in addition to the tail lamp. The vehicle lighting fixture 1 is mounted on the both left and right sides on the rear part of the vehicle V, respectively.

Hereinafter, the vehicle lighting fixture 1 mounted on the left side of the vehicle will be described. Note that the vehicle lighting fixture mounted on the right side of the vehicle is approximately symmetrical to the configuration of the vehicle lighting fixture 1 mounted on the left side of the vehicle. Thus, the explanation of the vehicle lighting fixture mounted on the right side of the vehicle will be omitted.

The vehicle lighting fixture 1 includes a lamp housing 10, a lamp lens 11, a light source portion 2, a reflective portion 3, and a shielding member (in this example, the vehicle body panel P).

The lamp housing 10 is constituted by, for example, a light non-transmissive member (resin member or the like).

The lamp lens 11 is a transparent outer cover, an outer lens or the like, for example. The lamp lens 11, in this example, is constituted by a light-transmissive resin member such as PC, PMMA and the like. A preferred material for the lamp lens 11 is a material with high transmittance in a visible light range. The lamp lens 11, in this example, forms a red color. Note that, if light L1 from the light source portion 2 is red light, the lamp lens 11 may be colorless and transparent.

The lamp lens 11 is mounted on the lamp housing 10. As a result, the lamp housing 10 and the lamp lens 11 form a light chamber 12.

(Explanation of Light Source Portion 2) The light source portion 2 is disposed in the light chamber 12. The light source portion 2 is mounted at least on either one of the lamp housing 10 and the lamp lens 11 via a mounting member (not shown). The light source portion 2 is mounted inside a ceiling part of the vehicle body panel P via the lamp housing 10. Note that the lamp housing 10 is mounted on the vehicle body panel P either directly or via the mounting member (not shown).

Moreover, the light source portion 2, together with the lamp housing 10 and lamp lens 11, are covered by a part of the ceiling part of the vehicle body panel P as a shielding member. As a result, the light source portion 2, the lamp housing 10, and the lamp lens 11 are blocked by the vehicle body panel P and are not seen when viewed from the rear side of the vehicle V, as indicated by broken lines in FIG. 1 and FIG. 2.

In other words, the vehicle lighting fixture 1 includes a part of the ceiling part of the vehicle body panel P as a shielding member which blocks the light source portion 2 from a line of sight (L4) in a direction opposite to an emission direction of light (emitted light L3) of the reflective portion 3. As a result, the light source portion 2 is blocked by a part of the ceiling part of the vehicle body panel P as the shielding member from the line of sight (L4) in the direction opposite to the emission direction of the light (emitted light L3) of the reflective portion 3 and is not seen. That is, the light source portion 2 is disposed at a position which is not physically visible when the light source portion 2 is off. Note that, as indicated by two dotted chain lines in FIG. 3, by providing a decorative ceiling panel P1 on the ceiling inside the cabin R, the light source portion 2 is not physically visible from inside the cabin R, either.

The light source portion 2 has a light source 20 and an optical substrate 21. The light source 20 is, in this example, an LED that emits light L2. The light source 20 is mounted on the lamp housing 10 via a circuit board 22 or the like. The light L2 from the light source 20 is red light in this example, but if the lamp lens 11 is a lens in a red color, it may be white light.

The number of the light sources 20 may be one or plural. When the number of the light sources 20 is plural, each of the plural light sources 20 may be controllable to be turned on/off.

The optical substrate 21 is supported by the circuit board 22 via a support member 23 and the like. The optical substrate 21 is disposed between the light source 20 and the lamp lens 11. The optical substrate 21 is, in this example, constituted by a light-transmissive resin member such as PC, PMMA and the like or glass. A preferred material for the optical substrate 21 is a material with high transmittance in a visible light range. The optical substrate 21 is optically designed to satisfy light distribution of a tail lamp function.

The optical substrate 21 has a design part 24 provided. The design part 24 is outside the light chamber 12 and designs the light L3 (hereinafter referred to as "emitted light L3") that is emitted to the rear side of the vehicle V outside the cabin R. In other words, the design part 24 designs the light L2 from the light source 20 as the design of the tail lamp function and emits it as the light L1 from the light source portion 2 to the reflective portion 3 side.

The design part 24, in this example, is constituted by a diffusion surface. Therefore, the emitted light L3 designed in the design part 24 is a square light emitting surface, as shown in a part with a grid pattern in FIG. 2. Note that the design of the light emitting surface of the emitted light L3 may be a design of a light emitting surface with a shape other than the square in this example.

Moreover, surface roughness of the design part 24 is not particularly important, since a haze ratio of the design part 24 needs to be considered in accordance with the design.

Note that, as the light source portion 2, the light source portions 2C, 2D, 2F of the vehicle lighting fixtures 1C, 1D, 1F according to Embodiments 4, 5, 7 below may be used. In this case, as the lamp lens 11, a lamp lens constituted by a colorless light-transmissive material may be used.

Alternatively, a light source portion 2E of the vehicle lighting fixture 1E according to Embodiment 6 below may be used as the light source portion 2. In this case, a lamp lens (red lamp lens) constituted by a light-transmissive member of a color that absorbs the excitation light L6 of the light source portion 2E is preferably used as the lamp lens 11.

(Explanation of Reflective Portion 3) The reflective portion 3 has an integral structure with the lamp lens 11. Note that the reflective portion 3 and the lamp lens 11 may have separate structures. The reflective portion 3 is disposed outside the light chamber 12, facing the lamp lens 11. The reflective portion 3 is disposed below the light source portion 2. In other words, the light source portion 2 and the reflective portion 3 are disposed vertically.

The reflective portion 3 reflects the light L1 from the light source portion 2 emitted from the lamp lens 11 to outside the light chamber 12 and emits the reflected light L3 in a predetermined direction (in a direction satisfying light distribution of the tail lamp function) again to the rear side of the vehicle V outside the light chamber 12 and outside the cabin R as the emitted light L3.

Moreover, the reflective portion 3 transmits light L4 (hereinafter referred to as "external light L4". See a solid-line arrow L4 in FIG. 3) from the rear side of the vehicle V outside the light chamber 12 and outside the cabin R to a front side of the vehicle V outside the light chamber 12 and in the cabin R.

The reflective portion 3, in this example, similarly to the lamp lens 11, is constituted by a light-transmissive resin member such as PC, a PMMA and the like or glass. The reflective portion 3 is constituted by a transparent member with a refractive index larger than 1, at least in the visible light range. The reflective portion 3 may be colorless or colored.

The reflective portion 3, in this example, constitutes a part of a window glass G on a rear part as a transparent wall member which forms the cabin R. In other words, the reflective portion 3 is constituted by a part of the window glass G. The reflective portion 3 is constituted by a single plate member. The reflective portion 3 is disposed in the opening O of the vehicle body panel P on the rear part of the vehicle V, together with the window glass G.

The reflective portion 3, similarly to the optical substrate 21, is optically designed to satisfy the light distribution of the tail lamp function. Note that light distribution control may be executed by either one of the reflective portion 3 and the optical substrate 21. Moreover, the lamp lens 11 may be added to the light distribution control.

Note that the reflective portion 3, in this example, is a transparent wall member that forms the cabin R and constitutes a part of the window glass G. However, the reflective portion 3 may be any transparent wall member other than the window glass G. In other words, the reflective portion 3 may be a part of the transparent wall member which forms a part of the vehicle body panel P at an arbitrary part of the vehicle V. In this case, an inside of the reflective portion 3 does not necessarily have to be the cabin R. For example, it may be a trunk room.

Explanation of Actions of Embodiment 1

The vehicle lighting fixture 1 according to this Embodiment 1 is configured as described above, and actions thereof will be described below.

Figure 3:
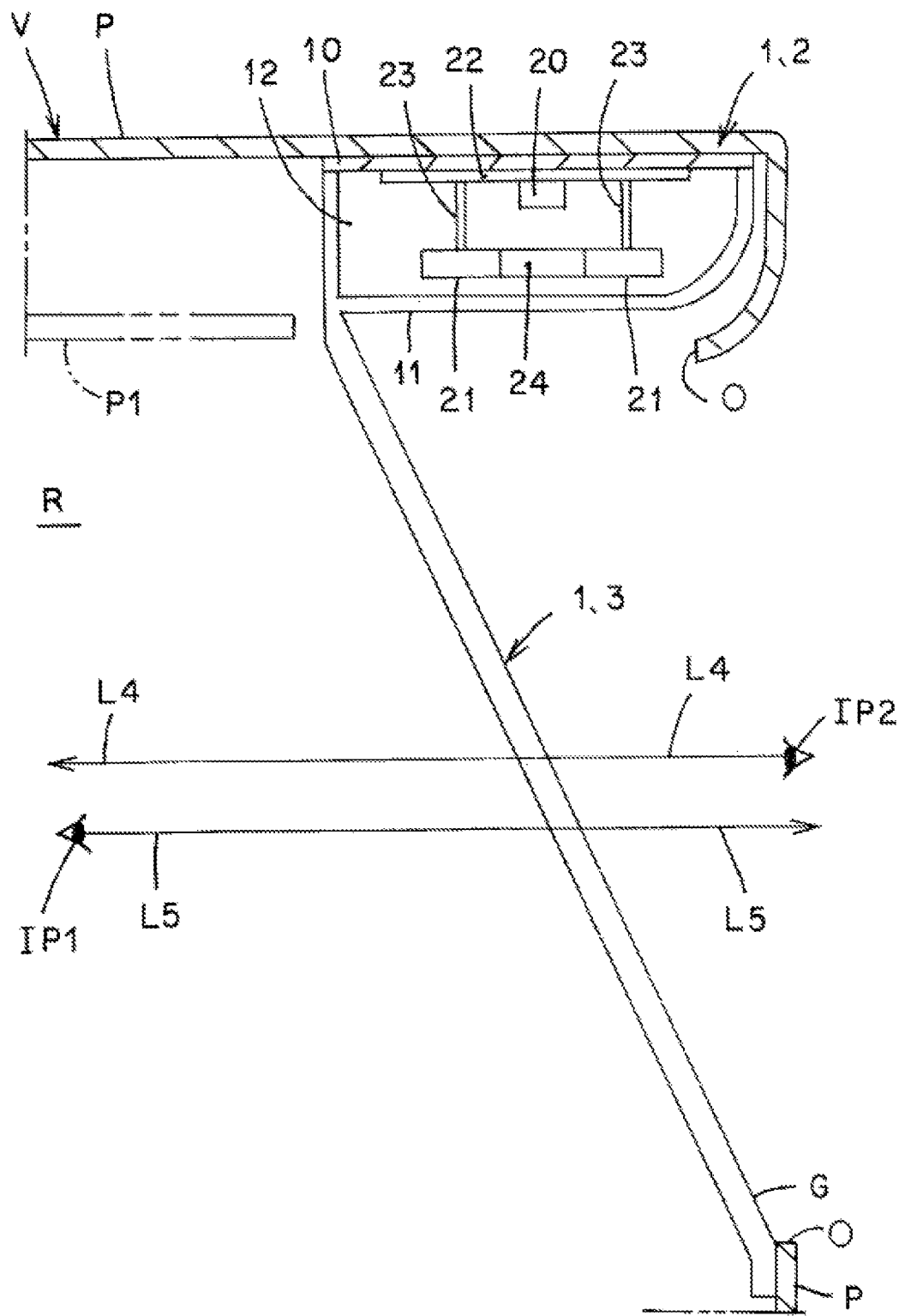
FIG. 3 is a vertical-sectional view showing a state when the light is off line sectional view in FIG. 1).

When the light source 20 in the light source portion 2 is off, it is in a state shown in FIGS. 1 and 3. In other words, the light distribution of the tail lamp function is not emitted. At this time, the reflective portion 3 is a part of the window glass G and is constituted by a transparent material. Therefore, the person H in the cabin R can see a scenery outside the cabin R through the reflective portion 3 and the window glass G from an eye point IP1, as indicated by the line of sight L5 of the solid-line arrow in FIG. 3.

On the other hand, the external light L4 enters the cabin R through the reflective portion 3 from the rear side of the vehicle V outside the cabin R, as indicated by the solid-line arrow in FIG. 3. At this time, the external light L4 is not reflected in the reflective portion 3 to the light source portion 2 side. Therefore, as indicated by the solid-line arrow L4 in FIG. 3, when looking into the cabin R from an eye point IP2 on the rear side of the vehicle V outside the cabin R through the reflective portion 3 and the window glass G, it appears as if there is no light source portion 2 or reflective portion 3. In particular, the light source portion 2 is covered by a part of a ceiling part of the vehicle body panel P as the shielding member, and is disposed at a physically invisible position, so that it is not visible from inside or outside the vehicle body panel P when the light is off. Note that, in FIG. 3, the same sign is used as the sign for the external light "L4" and as the sign for the line of sight "L4" from the eye point IP2 outside the cabin R.

Figure 2:
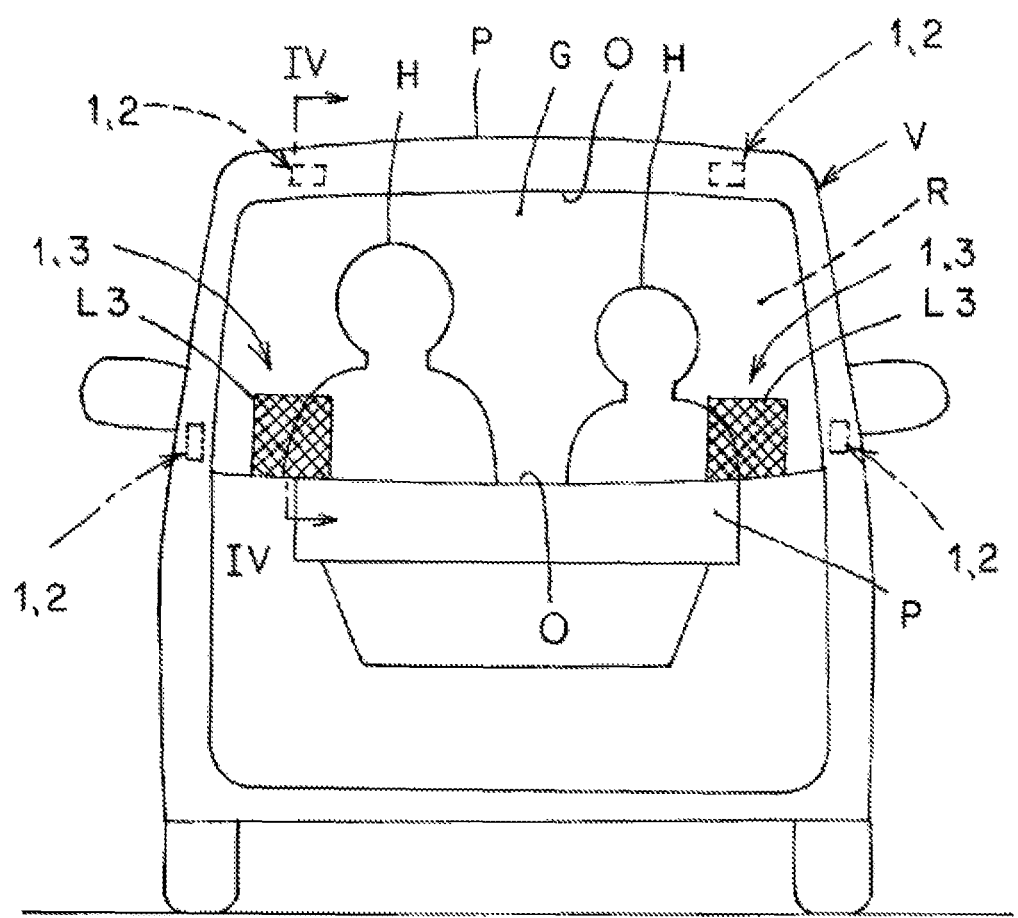
Figure 4:
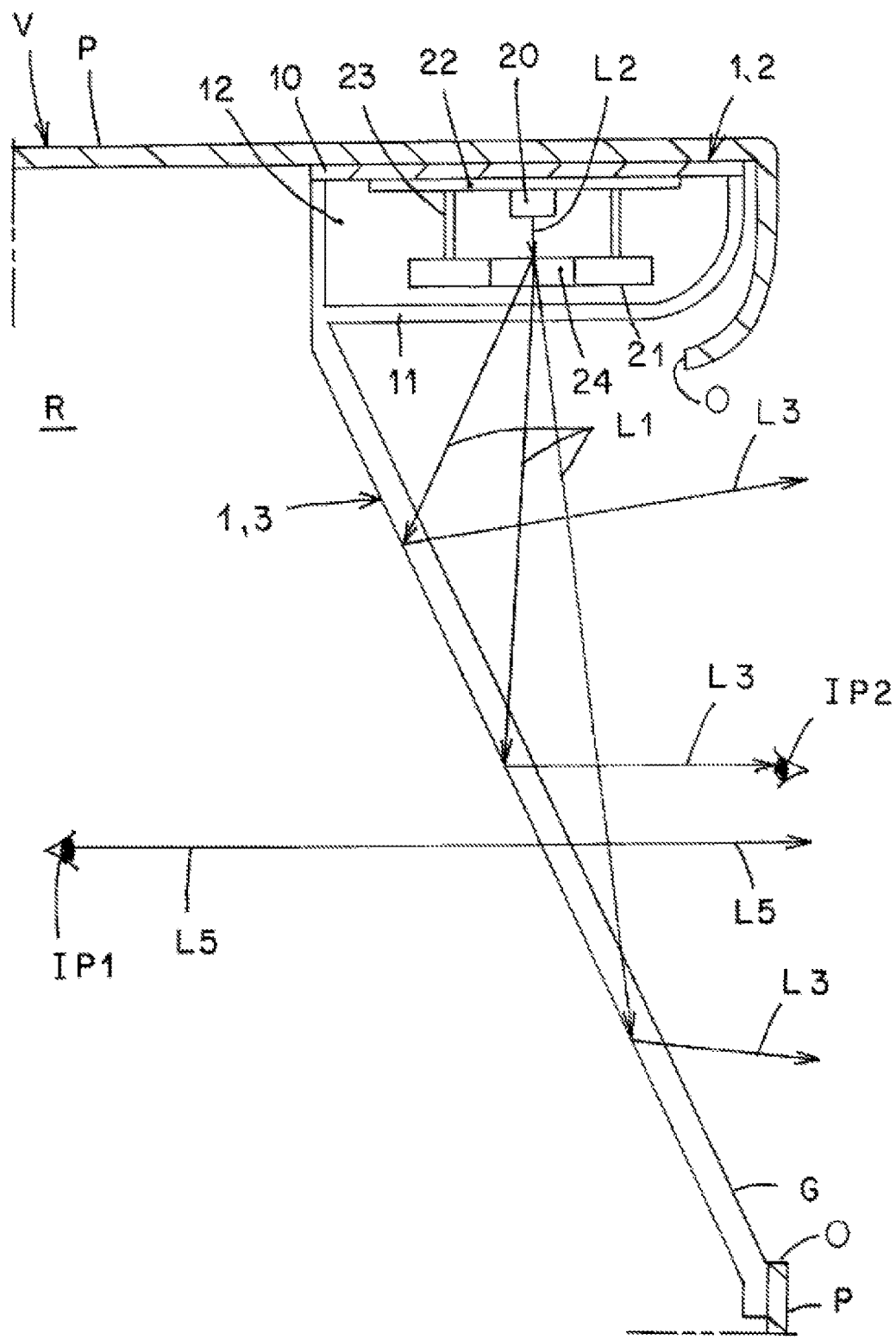

Turn on the light source 20 in the light source portion 2. Then, as shown in FIGS. 2 and 4, the light (red light) L2 emitted from the light source 20 passes through the optical substrate 21 and the design part 24. At this time, the light L2 is distribution-controlled and designed by the optical substrate 21 and the design part 24.

The light L1 which was distribution-controlled and designed is, as the light (red light) L1 from the light source portion 2, transmitted through the lamp lens 11 and emitted from the upper side to the lower side of the vehicle V to outside the light chamber 12. The light L1 emitted to outside the light chamber 12 is further distribution-controlled in the predetermined direction and reflected in the reflective portion 3. The reflected light L3, as the emitted light L3, is emitted again from the front side toward the rear side of the vehicle V to outside the light chamber 12 and outside the cabin R. In other words, the light distribution of the tail lamp function is emitted to the rear side of the vehicle V.

As described above, an optical axis of the emitted light L1 from the lamp lens 11 of the light source portion 2 (axis from the upper side to the lower side of the vehicle V) disposed on the upper side and the optical axis of the emitted light L3 from the reflective portion 3 (axis from the front side to the rear side of the vehicle V) disposed on the lower side with respect to the light source portion 2 are changed in a medium of the reflective portion 3. Moreover, the distribution-controlled and designed light L1 is further distribution-controlled and reflected in a predetermined direction in the reflective portion 3.

The emitted light L3 enters the eye point IP2 of a person on the rear side of the vehicle V outside the cabin R. As a result, a light emitting surface of the tail lamp function (the area with a grid pattern in FIG. 2) emits light and is visually recognized in a part of the window glass G.

Note that, even when the light source portion 2 is on, the person H in the cabin R can see the scenery outside the cabin R through the reflective portion 3 and the window glass G from the eye point IP1, as indicated by a line of sight L5 of a solid-line arrow in FIG. 4.

(Explanation of Effects of Embodiment 1) The vehicle lighting fixture 1 according to Embodiment 1 has the configurations and actions as described above, and effects thereof will be described below.

The vehicle lighting fixture 1 according to this Embodiment 1 has the light source portion 2 disposed at a position shifted to the upper side with respect to the emission direction (horizontal direction) of the emitted light L3 from the reflective portion 3. In other words, in the vehicle lighting fixture 1 according to this Embodiment 1, the light source portion 2 is disposed at a position which is not visible from the line of sight (L4) in a direction opposite to the emission direction of the emitted light L3 from the reflective portion 3. As a result, regarding the vehicle lighting fixture 1 according to this Embodiment 1, when the light source portion 2 is off and when viewed from the line of sight (L4) in the direction opposite to the emission direction of the emitted light L3 from the reflective portion 3, the reflective portion 3 of the transparent member can be seen, whereby a transparent appearance can be obtained.

Moreover, in the vehicle lighting fixture 1 according to this Embodiment 1, when the light source portion 2 is on, light from the light source portion 2 is reflected in the reflective portion 3 and emitted in a predetermined direction. As a result, in the vehicle lighting fixture 1 according to this Embodiment 1, when the light source portion 2 is on, the light (emitted light L3) can be seen from the reflective portion 3 of the transparent member, that is, the transparent spot, when viewed from the line of sight (L4) in the direction opposite to the emission direction of the emitted light L3 from the reflective portion 3.

In the vehicle lighting fixture 1 according to Embodiment 1, since the reflective portion 3 is constituted by a transparent member whose refractive index is larger than 1 at least in the visible light range, the light L1 from the light source portion 2 can be reliably reflected by this reflective portion 3 and emitted in the predetermined direction. As a result, the predetermined light distribution of the lamp function (tail lamp function) can be obtained by the vehicle lighting fixture 1 according to this Embodiment 1.

The vehicle lighting fixture 1 according to this Embodiment 1 includes a part of the ceiling part of the vehicle body panel P as the shielding member that blocks the light source portion 2 from the line of sight (L4) in the direction opposite to the emission direction of the emitted light L3 from the reflective portion 3. As a result, in the vehicle lighting fixture 1 according to this Embodiment 1, the light source portion 2 is blocked (covered) by a part of the ceiling part of the vehicle body panel P as the shielding member and thus, the light source portion 2 is not visible when the light source portion 2 is off. In addition, in the vehicle lighting fixture 1 according to this Embodiment 1, since the reflective portion 3 reflects the light L1 from the light source portion 2 and emits it in the predetermined direction, the reflective portion 3 of the transparent member appears to shine when the light is on. As described above, in the vehicle lighting fixture 1 according to this Embodiment 1, the light source portion 2 is not visible when the light is off, while the light L1 from the light source portion 2 is visible when the light is on. In other words, the vehicle lighting fixture 1 according to this Embodiment 1 ensures that a transparent appearance is reliably obtained when the light source portion 2 is off, and when the light source portion 2 is on, the light (emitted light L3) is reliably visible from the transparent spot.

The vehicle lighting fixture 1 according to this embodiment 1 has the light source portion 2 disposed in the light chamber 12 formed by the lamp housing 10 and the lamp lens 11 and the reflective portion 3 disposed outside the light chamber 12, facing the lamp lens 11. As a result, in the vehicle lighting fixture 1 according to this Embodiment 1, when the light source portion 2 is off, the light from outside the light chamber 12, that is, the external light L4 is transmitted through the reflective portion 3 and thus, the reflective portion 3 outside the light chamber 12 remains transparent and invisible, and the light source portion 2 in the light chamber 12 is also physically invisible.

Thus, the vehicle lighting fixture 1 according to this Embodiment 1 is a vehicle lighting fixture which is an invisible lamp when the light source portion 2 is off. Moreover, the vehicle lighting fixture 1 according to this Embodiment 1 is apparently a lamp lens-less vehicle lighting fixture without using a lamp lens.

The vehicle lighting fixture 1 according to this Embodiment 1 causes the reflective portion 3 to reflect the light L1 from the light source portion 2 emitted from the lamp lens 11 to outside the light chamber 12 and to emit the reflected light L3 again to outside the light chamber 12 as the emitted light L3. As a result, in the vehicle lighting fixture 1 according to this Embodiment 1, the reflective portion 3 outside the light chamber 12 appears to glow when the light source portion 2 is on.

In addition, the vehicle lighting fixture 1 according to this Embodiment 1 has the light source portion 2 and the reflective portion 3 disposed vertically, and the emission direction (direction from the upper side to the lower side of the vehicle V) of the emitted light L1 from the lamp lens 11 of the light source portion 2 and the emission direction (direction from the front side to the rear side of the vehicle V) of the emitted light L3 from the reflective portion 3 are changed in the reflective portion 3. As a result, the vehicle lighting fixture 1 according to this Embodiment 1 becomes a vehicle lighting fixture which has a depth dimension equal to a thickness of the reflective portion 3, which is smaller than the depth dimension from the lamp housing to the lamp lens of a conventional vehicle lighting fixture. In other words, the vehicle lighting fixture 1 according to this Embodiment 1 is a compact vehicle lighting fixture.

The vehicle lighting fixture 1 according to this embodiment 1 is the one in which the reflective portion 3 is constituted by a part of the window glass G of the transparent wall member which forms the cabin R. As a result, the vehicle lighting fixture 1 according to this Embodiment 1 allows the person H in the cabin R to see the scenery outside the cabin R through the reflective portion 3 and the window glass G when the light source portion 2 is off. On the other hand, when looking into the cabin R from the rear side of the vehicle V outside the cabin R through the reflective portion 3 and the window glass G, it appears as if the light source portion 2 and the reflective portion 3 are absent.

The vehicle lighting fixture 1 according to this Embodiment 1 is the one in which the reflective portion 3 is constituted by a single plate member and thus, the reflective portion 3 can be manufactured inexpensively and moreover, it is suitable for a single piece of the window glass G.

In the vehicle lighting fixture 1 according to this Embodiment 1, the light source portion 2 has the light source 20 and the optical substrate 21 and thus, the emitted light L3 emitted from the reflective portion 3 is distribution-controlled, and light distribution of the predetermined lamp function (in this example, the tail lamp function) can be obtained.

The vehicle lighting fixture 1 according to this embodiment 1 has the design part 24 that designs the design of the emitted light L3 emitted to outside of the light chamber 12 provided on the optical substrate 21 and thus, light distribution of an arbitrary design can be obtained along with the light distribution of the predetermined lamp function (in this example, the tail lamp function). Moreover, since the design part 24 is constituted by a diffusion surface, light distribution of surface emission can be obtained.

In the vehicle lighting fixture 1 according to this Embodiment 1, when it has a plurality of the light sources 20 in the light source portion 2, the plurality of light sources 20 can be controlled to be turned on/off, respectively, so that dynamic light emitting surfaces and light distribution can be obtained. Moreover, the reflective portion 3 has a display function.

Explanation of the Configuration, Actions, and Effects of Embodiment 2

Figure 5:
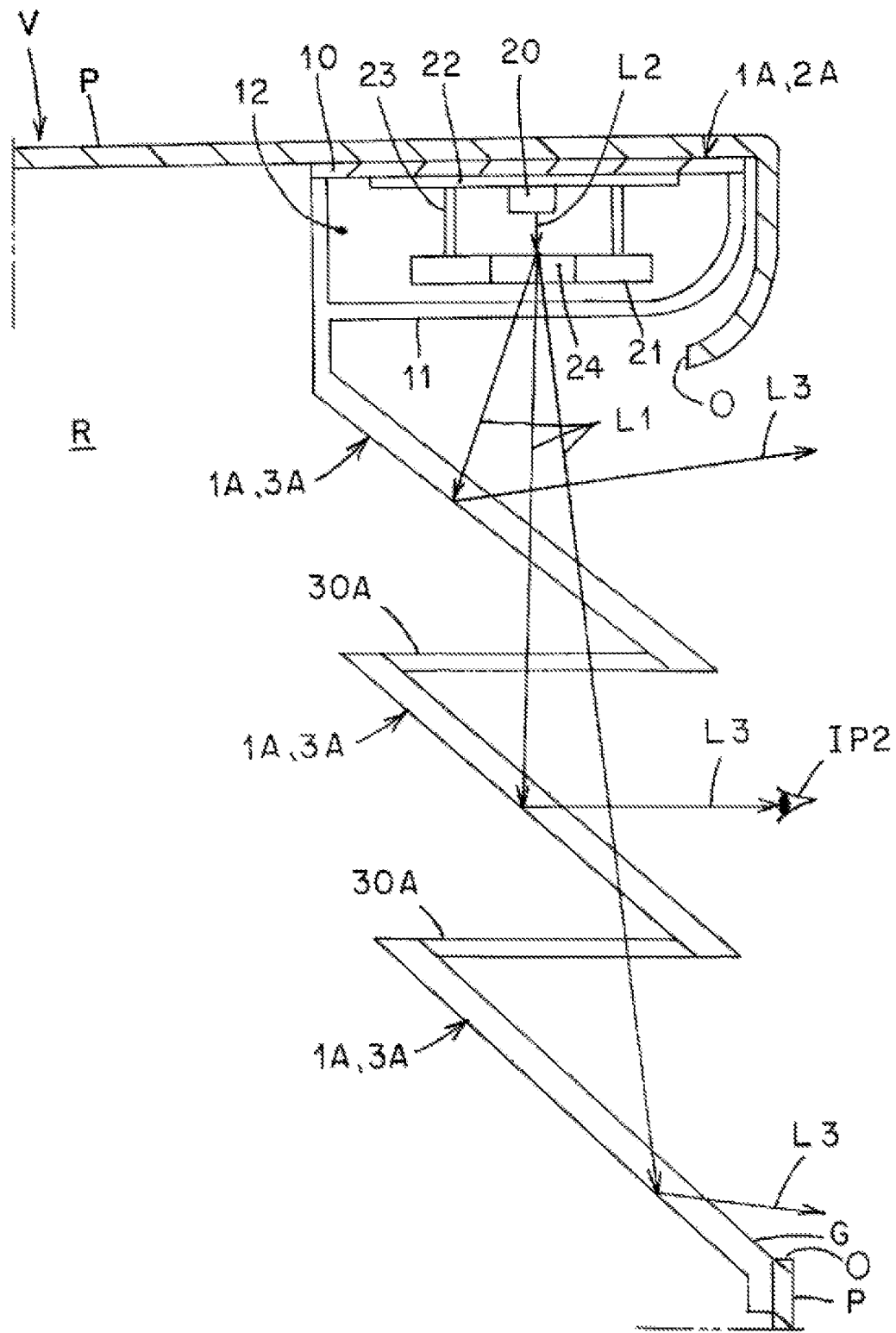

FIG. 5 illustrates Embodiment 2 of the vehicle lighting fixture according to the present invention. Hereinafter, the configuration, actions, and effects of the vehicle lighting fixture 1A according to this Embodiment 2 will be described. In the figures, the same signs as those in FIGS. 1 to 4 indicate the same components.

The vehicle lighting fixture 1A according to this Embodiment 2 is a variation of the vehicle lighting fixture 1 according to Embodiment 1 described above. Note that a light source portion 2A of the vehicle lighting fixture 1A according to this Embodiment 2 has the configuration similar to that of the light source portion 2 of the vehicle lighting fixture 1 according to Embodiment 1 described above.

The reflective portion 3 of the vehicle lighting fixture 1 according to Embodiment 1 described above is constituted by a single plate member. In contrast, in the vehicle lighting fixture 1A according to this Embodiment 2, the reflective portion 3A is constituted by a plurality of plate members or three plate members in this example. Note that the reflective portion 3A may have two, four or more pieces.

Among the three reflective portions 3A, light-transmissive parts 30A are provided. The light-transmissive part 30A may be constituted by a transparent member or may be a space. In the case of the space, the three reflective portions 3A are mutually supported by support members such as wire members or bar members.

In the vehicle lighting fixture 1A according to this Embodiment 2, the reflective portion 3A is constituted by three plate members, so that a part of the light L1 from the light source portion 2A is reflected as the emitted light L3 in the first reflective portion 3A, and the rest of the light L1 from the light source portion 2A is transmitted through the first reflective portion 3A.

A part of the light L1 from the light source portion 2A transmitted through the first reflective portion 3A is reflected by the second reflective portion 3A as the emitted light L3, and the rest is transmitted through the second reflective portion 3A. Moreover, a part of the light L1 from the light source portion 2A transmitted through the second reflective portion 3A is reflected as the emitted light L3 in the third reflective portion 3A.

Since the vehicle lighting fixture 1A according to this Embodiment 2 has the configuration and actions as above, it can achieve the effect similar to that of the vehicle lighting fixture 1 according to Embodiment 1 described above. In particular, the vehicle lighting fixture 1A according to this Embodiment 2 is the one in which the reflective portion 3A is constituted by three plate members, so that a novel light distribution of the lamp function can be obtained.

Explanation of Configuration, Actions, and Effects of Embodiment 3

Figure 6:
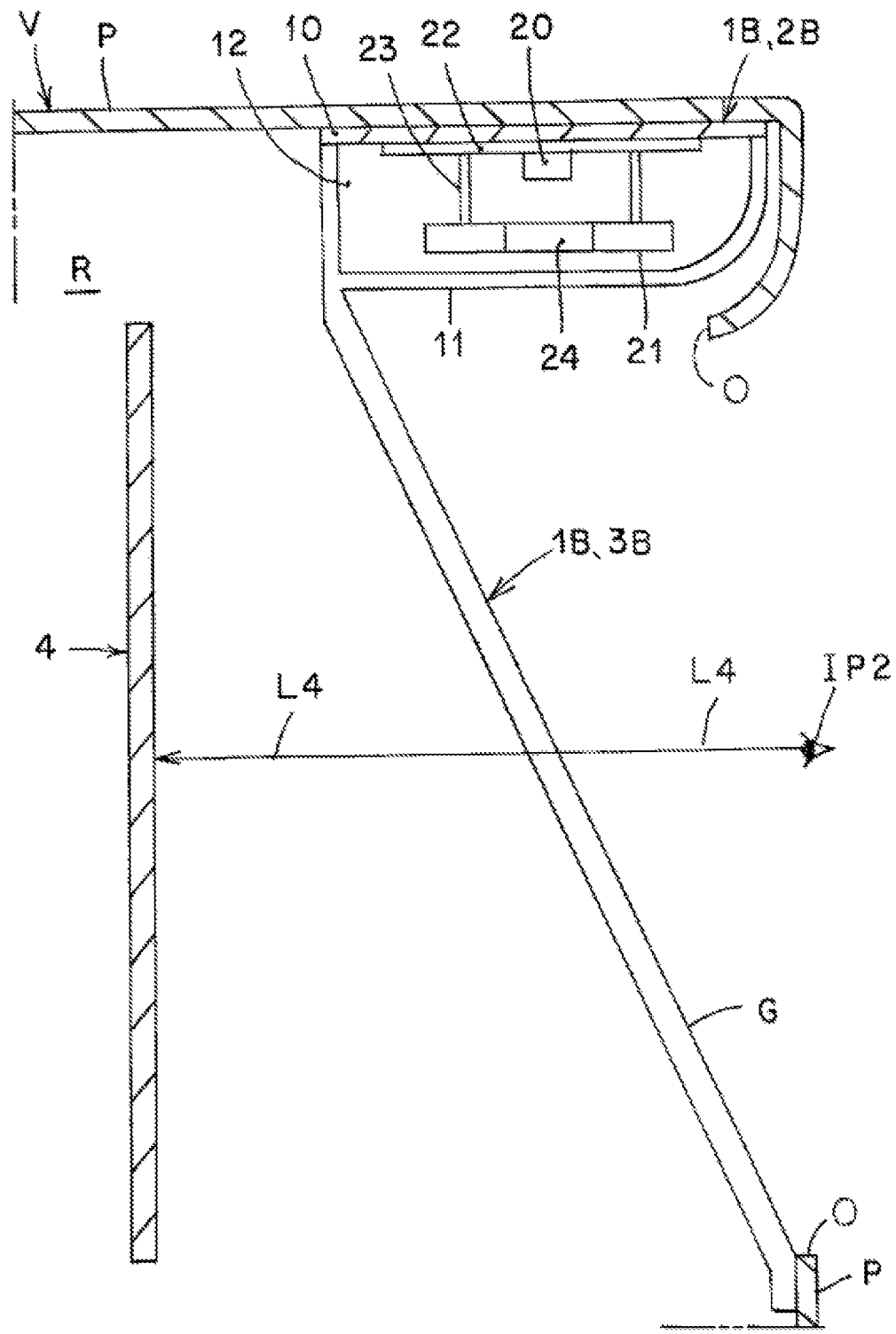
FIG. 6 is a vertical-sectional view (vertical-sectional view corresponding to FIG. 3) of Embodiment 3 of the vehicle lighting fixture according to this invention showing the state when the light is off.

FIG. 6 illustrates Embodiment 3 of the vehicle lighting fixture according to the present invention. Hereinafter, the configuration, actions, and effects of the vehicle lighting fixture 1B according to this Embodiment 3 will be described. In the figures, the same signs as those in FIGS. 1 to 5 indicate the same components.

The vehicle lighting fixture 1B according to this Embodiment 3 is a variation of the vehicle lighting fixture 1 according to Embodiment 1 described above. Note that a light source portion 2B and a reflective portion 3B of the vehicle lighting fixture 1B according to this Embodiment 3 have the configuration similar to that of the light source portion 2 and the reflective portion 3 of the vehicle lighting fixture 1 according to Embodiment 1 described above.

The vehicle lighting fixture 1B according to this embodiment 3 includes a design member 4. At least either one of a front surface (a surface on the rear side of the vehicle V) or a rear surface (a surface on the front side of the vehicle V) of the design member 4 is decorated with a design.

The design member 4 is disposed on a side (front side of the vehicle V; hereinafter, referred to as "a rear surface side of the reflective portion 3") opposite to a direction side in which the reflective portion 3B reflects the light L1 from the light source portion 2B with respect to the reflective portion 3B (an emitting direction side of the emitted light L3 in FIG. 4 and FIG. 5 and on the rear side of the vehicle V. Hereinafter, referred to as "a front surface side of the reflective portion 3".

The design member 4 in this example is placed over the entire window glass G and the reflective portion 3. Note that the design member 4 may be disposed to correspond to a part of the window glass G and the reflective portion 3.

The front surface of the design member 4 faces the reflective portion 3B side. And the rear surface of the design member 4 faces the cabin R side on a side opposite to the reflective portion 3B.

Since the vehicle lighting fixture 1B according to this Embodiment 3 is constituted as above, as indicated by the solid-line arrow L4 in FIG. 6, the design of the design member 4 on the front surface can be seen when viewed into the cabin R from the rear side of the vehicle V through the reflective portion 3B. On the other hand, though not shown, the design on the rear surface of the design member 4 can be seen when looking at the rear side of the vehicle V from inside the cabin R.

Since the vehicle lighting fixture 1B according to this Embodiment 3 has the configuration and action as above, it can achieve the effect similar to those of the vehicle lighting fixtures 1 and 1A according to Embodiments 1 and 2 described above.

In particular, the vehicle lighting fixture 1B according to this Embodiment 3 has the design member 4 with a design disposed on the rear surface side of the reflective portion 3B and thus, when looking at the rear surface side of the reflective portion 3 from the front surface side of the reflective portion 3, the front design of the design member 4 can be seen and the rear surface side of the design member 4 can be covered.

Explanation of Configuration of Embodiment 4

Figure 7:
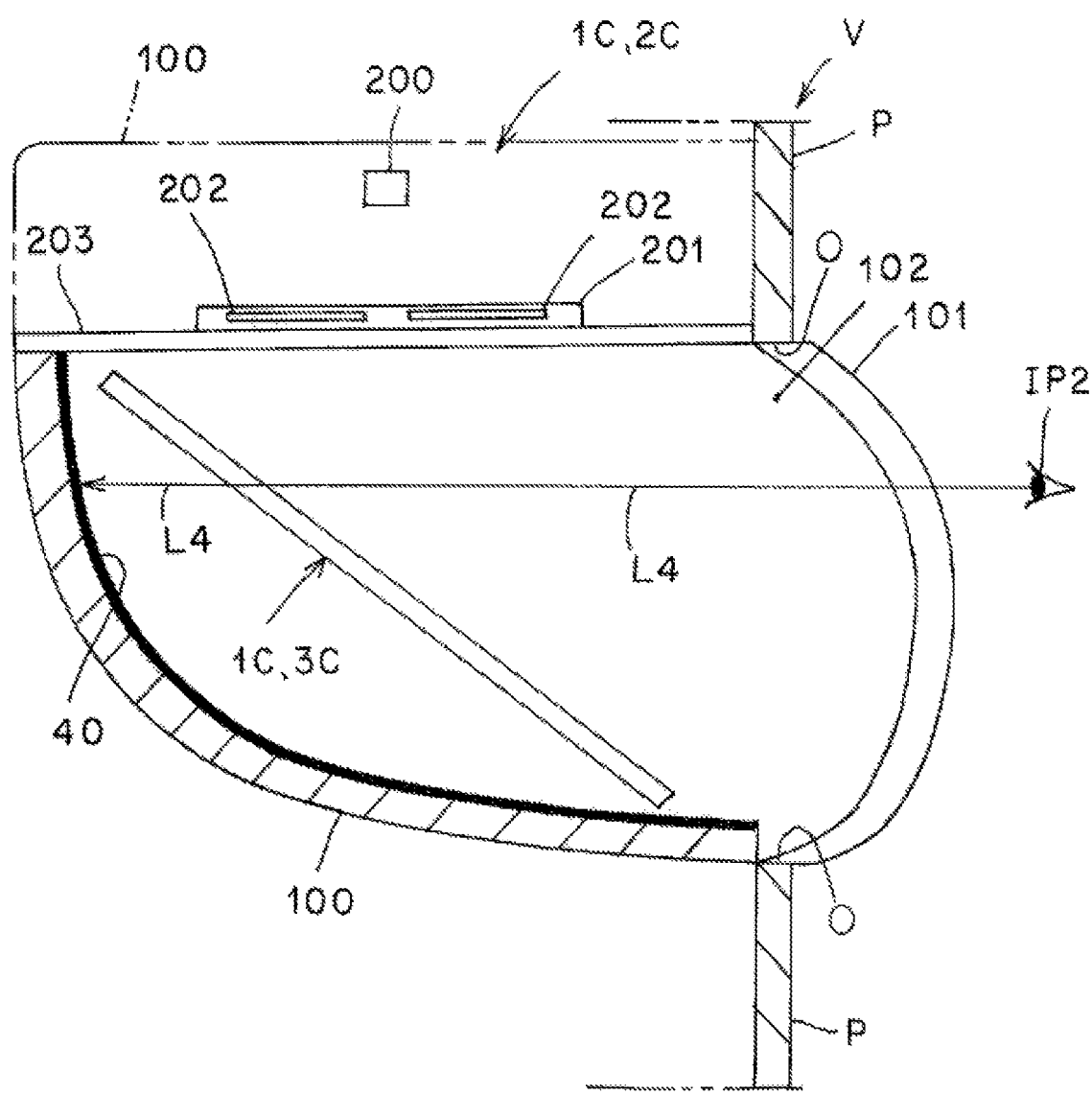
FIG. 7 is a vertical-sectional view of Embodiment 4 of the vehicle lighting fixture according to this invention showing the state where the light is off.
Figure 8:
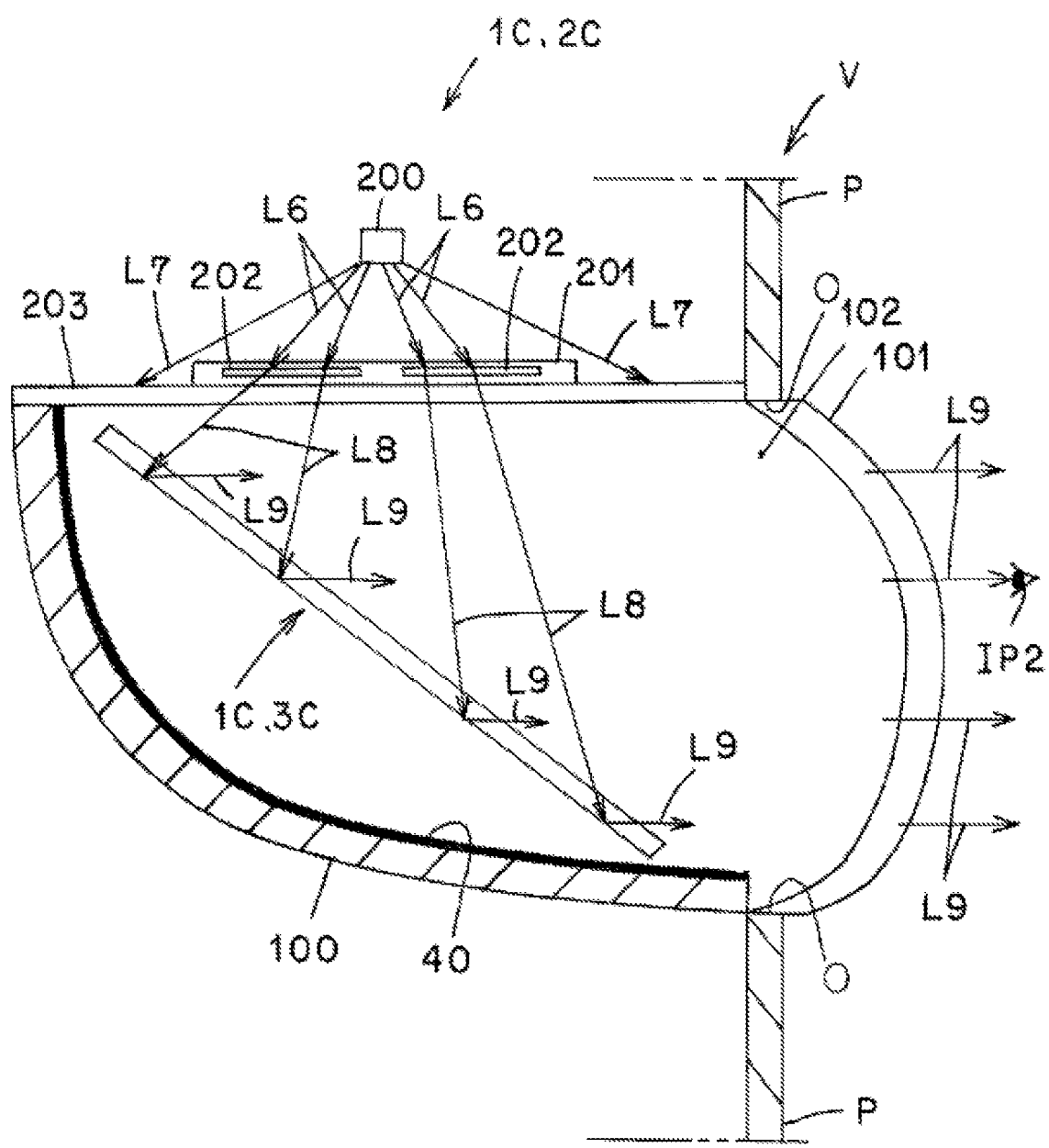

FIGS. 7 and 8 illustrate Embodiment 4 of the vehicle lighting fixture according to the present invention. Hereinafter, the configuration of the vehicle lighting fixture 1C according to this Embodiment 4 will be described. In the figures, the same signs as those in FIGS. 1 to 6 indicate the same components.

(Explanation of Vehicle Lighting Fixture 1C)

The vehicle lighting fixtures 1 to 1B according to Embodiments 1 to 3 above have the light source portions 2 to 2B disposed inside the light chamber 12 and the reflective portions 3 to 3B disposed outside the light chamber 12. In contrast, the vehicle lighting fixture 1C of this embodiment 4 has the reflective portion 3C disposed in the light chamber 12. The vehicle lighting fixture 1C according to this Embodiment 4 also includes one or a plurality of excitation light sources 200.

A light chamber 102 is formed by a lamp housing 100 and a lamp lens 101. The lamp housing 100 and the lamp lens 101 of this Embodiment 4 are almost similar to the lamp housings 10 and the lamp lenses 11 of Embodiments 1 to 3 described above.

The lamp housing 100 and the lamp lens 101 are mounted on the vehicle body panel P either directly or via a mounting member (not shown). The lamp lens 101 is disposed in the opening O of the vehicle body panel P.

On the surface on the light chamber 102 side of the lamp housing 100, an external-light absorbing layer 40 which absorbs the light transmitted through the lamp lens 101 from outside the light chamber 102 and having entered the light chamber 102, that is, the external light L4 is provided. A material with a high light absorption coefficient in the visible light range (visible light beam) is preferable for the external-light absorbing layer 40. In this example, true black paint is used.

The vehicle lighting fixture 1C according to this Embodiment 4 is disposed inside the vehicle body panel P of the vehicle V. The lamp lens 101 is disposed in an opening in the vehicle body panel P and is exposed to the outside of the vehicle body panel P. The lamp lens 101 in this example is constituted by a colorless light-transmissive member.

The vehicle lighting fixture 1C according to this Embodiment 4 has an upper part of the lamp housing 100 which forms the light chamber 102 open. The light source portion 2C is disposed in the upper-part opening portion of this lamp housing 100. That is, the light source portion 2C is disposed outside the light chamber 102 and faces the light chamber 102. Note that the lamp housing 100 may be configured as shown by a two-dot chain line in FIG. 7, so that the light source portion 2C is disposed inside the light chamber 102.

(Explanation of Light Source Portion 2C)

The light source portion 2C is mounted on the lamp housing 100 and the lamp lens 101 directly or via a mounting member (not shown). The light source portion 2C has a light conversion member 201, a light emitting layer 202, and an excitation-light blocking member 203.

The excitation light source 200 in this example emits the excitation light L6, L7 by using an LED, an LD (semiconductor laser) or the like. The excitation light L6, L7 is light with short wavelengths such as blue light, violet light, ultraviolet light and the like, for example. The sign "L6" denotes the excitation light incident to the light emitting layer 202. The sign "L7" denotes the excitation light that does not pass through the light emitting layer 202.

In the case of a plurality of the excitation light sources 200, each of the plurality of the excitation light sources 200 may be controllable to be turned on/off, similarly to the light sources 20 of the vehicle lighting fixtures 1 to 1B according to Embodiments 1 to 3 described above.

The light emitting layer 202 is constituted by organic light-emitting materials and inorganic light-emitting materials. The light emitting layer 202 generates the red light with photoluminescence or, in this example, a wavelength longer than that of the excitation light L6, L7 by the excitation light L6 emitted from the excitation light source 200.

The light conversion member 201 is disposed between the excitation light source 200 and the reflective portion 3C. The light conversion member 201 is constituted by a transparent support substrate similarly to the optical substrate 21 of the vehicle lighting fixtures 1 to 1B according to Embodiments 1 to 3 described above.

The light emitting layer 202 is formed on a part of the light conversion member 201. Note that the light emitting layer 202 may be formed on the whole of the light conversion member 201.

The light conversion member 201 is a member that causes the photoluminescence emitted in the light emitting layer 202 to enter the reflective portion 3C as light L8 from the light source portion 2C. The light conversion member 201 is optically designed to satisfy the light distribution of the tail lamp function.

In the light conversion member 201 or the light emitting layer 202 his example, a design part 202 (the same sign "202" as the sign "202" of the light emitting layer is used) that designs the design of the light emitted to outside of the light chamber 102 is provided. The design part 202 in this example is provided in an area approximately equivalent to the light emitting layer 202. In other words, the design part 202 is provided on a part of the light conversion member 201. Note that the design part 202 may be provided on the whole of the light conversion member 201. The design part 202 (light emitting layer 202) is constituted by diffusion surfaces.

The excitation-light blocking member 203 is disposed between the light conversion member 201 side and the sides of the reflective portion 3C and the lamp lens 101. The excitation-light blocking member 203 blocks excitation light L7 (leakage excitation light L7) which does not pass through the light emitting layer 202 of the light conversion member 201 in the excitation light L6, L7.

The excitation-light blocking member 203 is constituted by a member that transmits the photoluminescence (red light L8) and absorbs excitation light L6 and L7. In this example, it is constituted by a red transparent member.

(Explanation of Reflective Portion 3C)

The reflective portion 3C is mounted on the lamp housing 100 and the lamp lens 101 directly or via a mounting member (not shown). The reflective portion 3C is disposed in the light chamber 102, facing the light source portion 2C and the lamp lens 101, respectively. The reflective portion 3C causes light L8 (red light of photoluminescence) from the light source portion 2C to be reflected and transmitted through the lamp lens 101 and to be emitted in a predetermined direction to outside of the light chamber 102.

Moreover, the reflective portion 3C transmits the light (external light) L4 that is transmitted through the lamp lens 101 from outside the light chamber 102 and having entered the light chamber 102.

The reflective portion 3C in this example is constituted by a single plate member. Note that the reflective portion 3C may be constituted by a plurality of plate members as in the reflective portion 3A of the vehicle lighting fixture 1A according to Embodiment 2 described above.

Explanation of Actions of Embodiment 4

The vehicle lighting fixture 1C according to this Embodiment 4 is constituted as described above, and actions thereof will be described below.

When the excitation light source 200 is off, it is in the state shown in FIG. 7. In other words, the light distribution of the tail lamp function is not emitted. At this time, the external light L4 enters the light chamber 102 through the lamp lens 101 from the rear side of the vehicle V outside the light chamber 102, as indicated by the solid-line arrow in FIG. 7. Here, since the reflective portion 3C in the light chamber 102 is constituted by a transparent member, the external light L4 is transmitted through the reflective portion 3C and is not reflected toward the light source portion 2C side in the reflective portion 3C.

As a result, as indicated by the solid-line arrow L4 in FIG. 7, when looking into the light chamber 102 through the lamp lens 101 from the eye point IP2 on the rear side of the vehicle V outside the light chamber 102, it appears as if that the light source portion 2C or the reflective portion 3C are absent.

Moreover, the external light L4 transmitted through the reflective portion 3C is absorbed by the external-light absorbing layer 40 provided on the inner surface of the lamp housing 100. Therefore, such a state does not occur that the light source portion 2C and the like is reflected on the reflective portion 3C by the external light L4 and can be seen from outside the light chamber 102 through the lamp lens 101. In other words, if the external-light absorbing layer 40 is not provided, the external light L4 will be reflected by the inner surface of the lamp housing 100 and enter the light source portion 2C and the like, and the light source portion 2C and the like are reflected on the reflective portion 3C and can be seen from outside the light chamber 102 through the lamp lens 101 depending on the direction of the line of sight from the eye point IP2 outside the light chamber 102 in some cases. On the other hand, by providing the external-light absorbing layer 40, the external-light absorbing layer 40 absorbs the external light L4 and thus, such a state does not occur that the light source portion 2C or the like is reflected on the reflective portion 3C and can be seen from outside the light chamber 102 by the external light L4.

Turn on the excitation light source 200. Then, as shown in FIG. 8, a part L6 of the excitation light (blue light, violet light, ultraviolet light and the like with short wavelengths) L6, L7 emitted from the excitation light source 200 enters the light emitting layer 202 (design part 202) of the light conversion member 201. The light emitting layer 202 generates photoluminescence by the excitation light L6.

The photoluminescence is distribution-controlled in the light conversion member 201 and designed in the design part 202 of the light emitting layer 202. The photoluminescence subjected to distribution control and designed is transmitted, as light (red light) L8 from the light source portion 2C, through the excitation-light blocking member 203 from the light conversion member 201 outside the light chamber 102 and enters the reflective portion 3C inside the light chamber 102.

The light L8 incident to the reflective portion 3C is distribution-controlled in the predetermined direction and reflected in the reflective portion 3. The reflected light L9 is transmitted through the lamp lens 101 from inside the light chamber 102, as the emitted light L9, and is emitted to outside the light chamber 102 in the predetermined direction from the front side toward the rear side of the vehicle V. In other words, the light distribution of the tail lamp function is emitted to the rear side of the vehicle V.

This emitted light L9 enters the eye point IP2 of a person on the rear side of the vehicle V outside the light chamber 102, whereby the light emitting surface of the tail lamp function emits light in the lamp lens 101 and is visually recognized.

Note that the excitation light L7 that did not pass through the light emitting layer 202 of the light conversion member 201 in the excitation light L6, L7 is absorbed in the excitation-light blocking member 203. As a result, the excitation light L6, L7 does not enter the light chamber 102. As a result, in the light chamber 102, the light L8 from the light source portion 2 and the emitted light L9 are visible, while excitation light L6, L7 is not. In other words, such a state does not occur that the light L8 from the light source portion 2 and the emitted light L9 in different colors and the excitation light L6, L7 coexist in the light chamber 102, causing a sense of discomfort.

Explanation of Effects of Embodiment 4

The vehicle lighting fixture 1C according to this Embodiment 4 has configuration and actions as described above, and effects thereof will be described below.

Since the vehicle lighting fixture 1C according to this Embodiment 4 has the configuration and action as described above, it can achieve the effect similar to those of the vehicle lighting fixtures 1 to 1B according to Embodiments 1 to 3 described above.

In particular, the vehicle lighting fixture 1C according to this Embodiment 4 uses the photoluminescence generated by emitting the excitation light L6 from the excitation light source 200 to the light emitting layer 202 of the light conversion member 201 as the light L8 from the light source portion 2C. As a result, the vehicle lighting fixture 1C according to this Embodiment 4 can improve reliability of the light source with less expensive manufacturing costs as compared with an OLED (Organic LED) and moreover, surface light emission in the lamp lens 101 can be obtained similarly to the OLED (organic LED).

In addition, the vehicle lighting fixture 1C according to this Embodiment 4 has the excitation-light blocking member 203 which blocks the excitation light L7 that does not pass through the light emitting layer 202 of the light conversion member 201 disposed between the excitation light source 200 side and the sides of the reflective portion 3C and the lamp lens 101. As a result, the vehicle lighting fixture 1C according to this Embodiment 4 can use a colorless lamp lens (clear lamp lens) as the lamp lens 101 instead of using a colored lamp lens that absorbs the excitation light L7. As a result, in the vehicle lighting fixture 1C according to this Embodiment 4, when looking into the light chamber 102 through the colorless lamp lens 101 when the light source portion 2C is off, the reflective portion 3C, which is the transparent member in the light chamber 102, is not visible, and the inside of the light chamber 102 appears as an almost completely transparent space. On the other hand, when the light source 2C is on, the reflective portion 3C appears to be a light emitting surface through the colorless lamp lens 101.

The vehicle lighting fixture 1C according to this Embodiment 4 uses, as the excitation-light blocking member 203, the excitation-light blocking member 203 constituted by a member which transmits the photoluminescence (red light) and absorbs the excitation light L6, L7 (particularly, the leakage excitation light L7) and thus, the structure is simple and the manufacturing cost is low.

The vehicle lighting fixture 1C according to this Embodiment 4 has the external-light absorbing layer 40 which absorbs the external light L4 transmitted through the reflective portion 3C provided on the inner surface of the lamp housing 100. As a result, in the vehicle lighting fixture 1C according to this Embodiment 4, when the light is off, such a state does not occur that the external light L4 is reflected in the inner surface of the lamp housing 100, and the light source portion 2C and the like appear to be reflected on the reflective portion 3C depending on the direction of line of sight from the eye point IP2 outside the light chamber 102. In other words, in the vehicle lighting fixture 1C according to this Embodiment 4, when the light is off, the reflective portion 3C in the light chamber 102 is almost completely invisible.

The vehicle lighting fixture 1C according to this Embodiment 4 has the design part 202 (light emitting layer 202) that designs the design of the emitted light L9 emitted to outside the light chamber 12 provided on the light conversion member 201 and thus, light distribution of an arbitrary design can be obtained along with the light distribution of the predetermined lamp function. Moreover, since the design part 202 (light emitting layer 202) is constituted by a diffusion surface, light distribution of surface emission can be obtained.

The vehicle lighting fixture 1C according to this Embodiment 4 provides a novel light distribution of the lamp function when the reflective portion 3C is constituted by a plurality of plate members.

In the vehicle lighting fixture 1C according to this Embodiment 4, when it has a plurality of the excitation light sources 200, each of the plurality of excitation light sources 200 is configured to be controllable to be turned on/off, so that dynamic light emitting surfaces and light distribution can be obtained. Moreover, the reflective portion 3C has a display function.

Explanation of Configuration, Actions, and Effects of Embodiment 5

Figure 9:
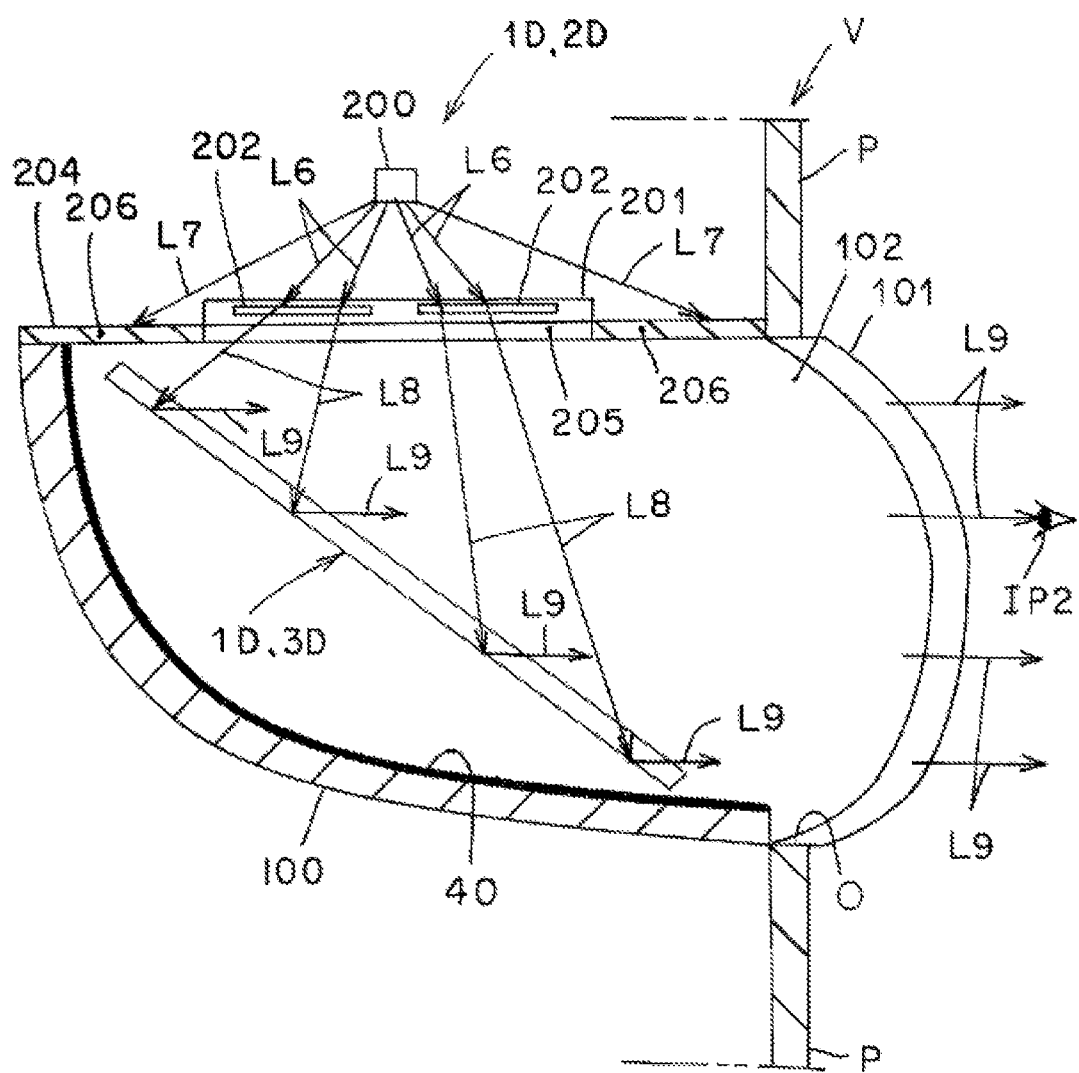

FIG. 9 illustrates Embodiment 5 of the vehicle lighting fixture according to the present invention. Hereinafter, the configuration, actions, and effects of the vehicle lighting fixture 1D according to this Embodiment 5 will be described. In the figures, the same signs as those in FIGS. 1 to 8 indicate the same components.

The vehicle lighting fixture 1D according to this Embodiment 5 is a variation of the vehicle lighting fixture 1C according to Embodiment 4 described above. Note that a light source portion 2D and a reflective portion 3D of the vehicle lighting fixture 1D according to this Embodiment 5 have the configurations similar to those of the light source portion 2C and the reflective portion 3C of the vehicle lighting fixture 1C according to Embodiment 4 described above.

The structure of an excitation-light blocking member 204 of the vehicle lighting fixture 1D according to this Embodiment 5 is different from the structure of the excitation-light blocking member 203 of the vehicle lighting fixture 1C according to Embodiment 4 above. The excitation-light blocking member 204 of the vehicle lighting fixture 1D according to this Embodiment 5 has a transmissive part 205 which transmits the photoluminescence (red light L8) and a non-transmissive part 206 that does not transmit the excitation light L6, L7 (in particular, the leakage excitation light L7).

The vehicle lighting fixture 1D according to this Embodiment 5 can achieve the working effect similar to that of the vehicle lighting fixture 1C according to Embodiment 4 described above.

Explanation of Configuration, Actions, and Effects of Embodiment 6

Figure 10:
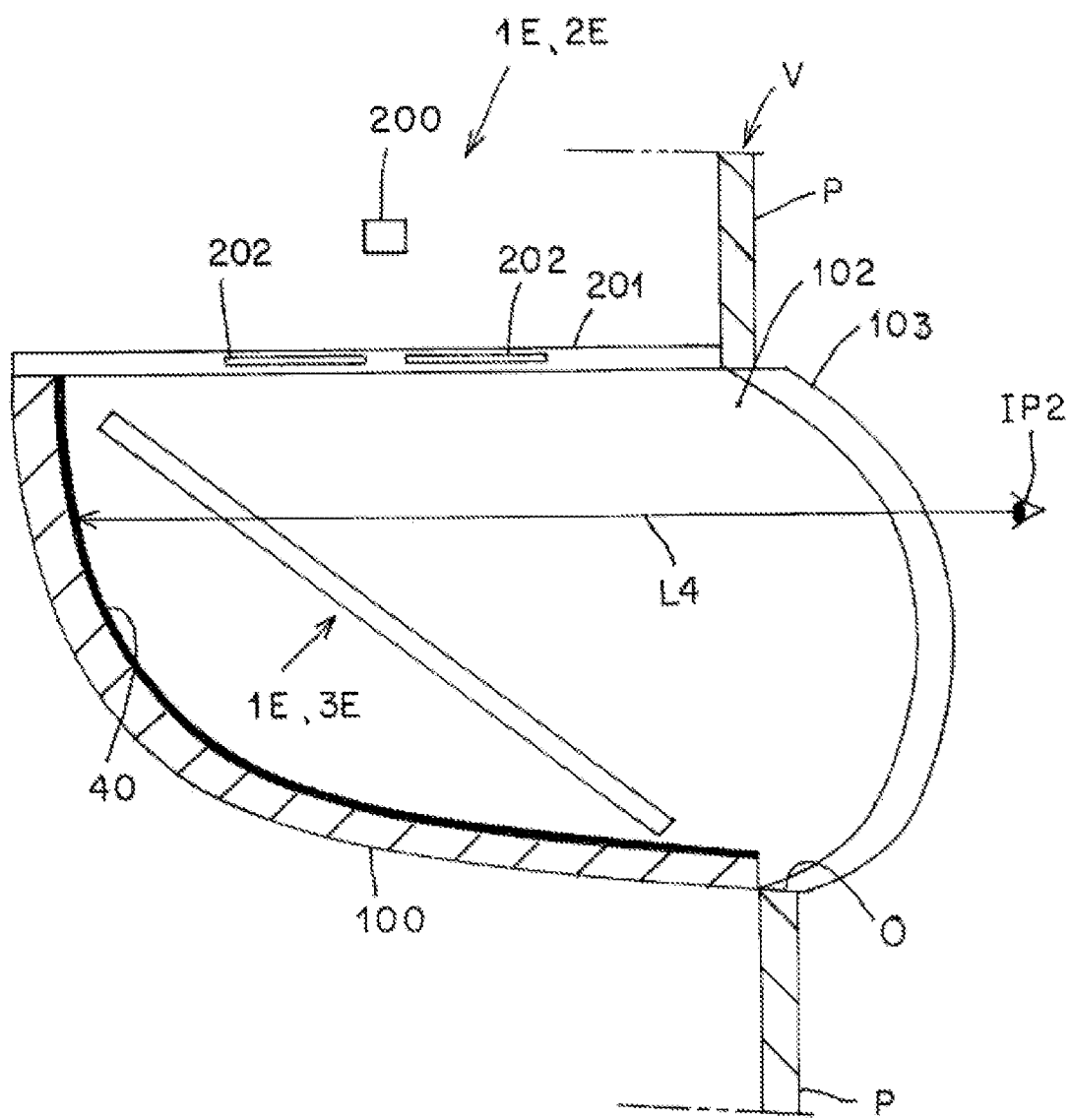
FIG. 10 is a vertical-sectional view of Embodiment 6 of the vehicle lighting fixture according to this invention showing the state when the light is off.
Figure 11:
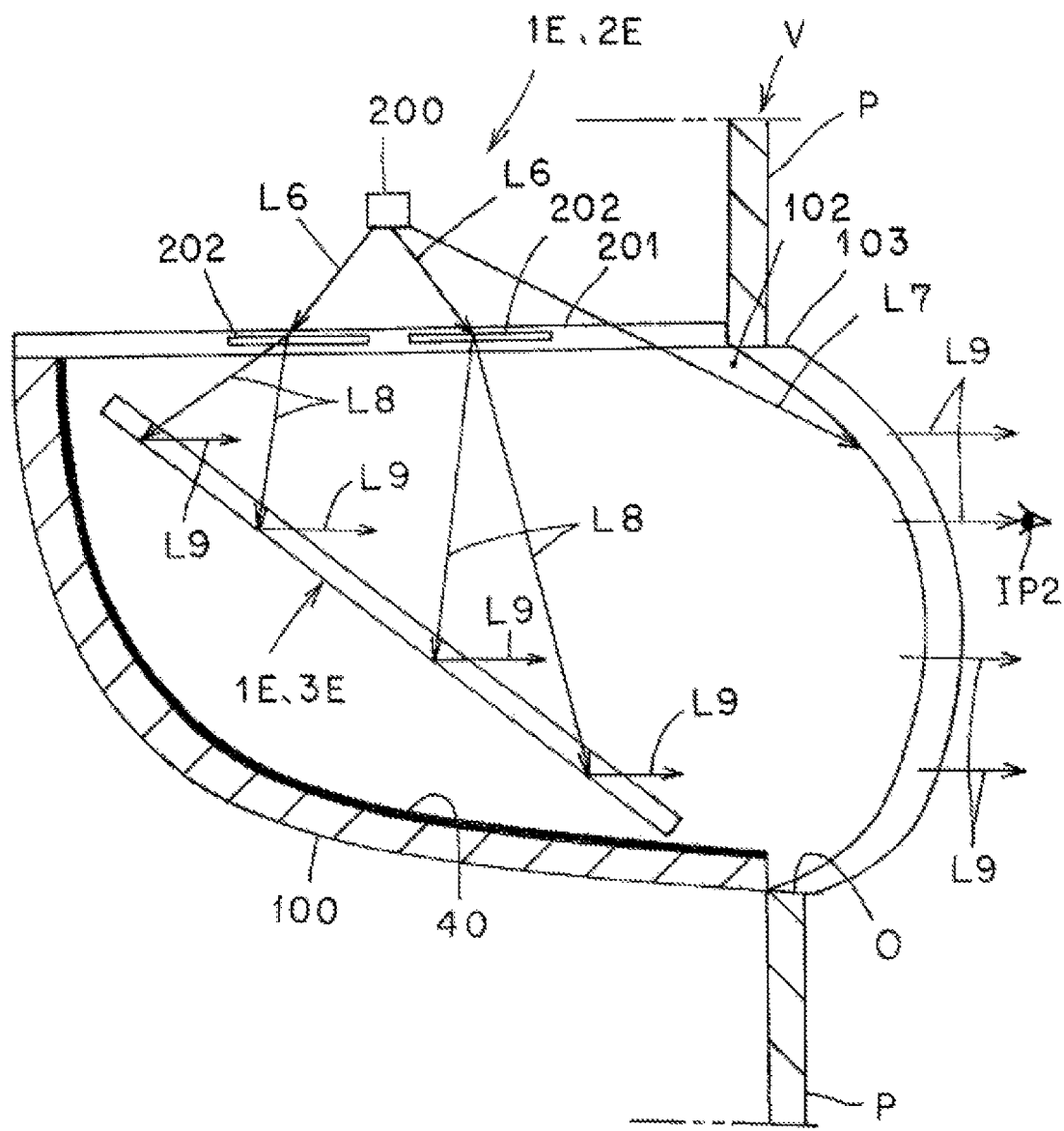

FIGS. 10 and 11 illustrate Embodiment 6 of the vehicle lighting fixture according to the present invention. Hereinafter, the configuration, actions, and effects of the vehicle lighting fixture 1E according to this Embodiment 6 will be described. In the figures, the same signs as those in FIGS. 1 to 9 indicate the same components.

The vehicle lighting fixture 1E according to Embodiment 6 is a variation of the vehicle lighting fixtures 1C, 1D according to Embodiments 4, 5 described above. Note that the light source portion 2E and a reflective portion 3E of the vehicle lighting fixture 1E according to this Embodiment 6 have the configurations similar to those of the light source portions 2C, 2D and the reflective portions 3C, 3D of the vehicle lighting fixtures 1C, 1D according to Embodiments 4, 5 described above.

The vehicle lighting fixtures 1C, 1D according to Embodiments 4, 5 described above can use a colorless lamp lens as the lamp lens 101 by using the excitation-light blocking members 203, 204, and as a result, when the light is off, the inside of the light chamber 102 appears almost completely transparent without the reflective portion 3C.

In contrast, the vehicle lighting fixture 1E according to this Embodiment 6 does not use the excitation-light blocking members 203, 204, but instead, uses, as the lamp lens 103, a member that transmits the photoluminescence (red light L8) and absorbs the excitation light L6, L7 (in particular, leakage excitation light L7) or the lamp lens 103 constituted by a red transparent member in this example.

As a result, the vehicle lighting fixture 1E according to this Embodiment 6 can achieve the working effect similar to those of the vehicle lighting fixtures 1C, 1D according to Embodiments 4, 5 above.

In particular, the vehicle lighting fixture 1E according to this Embodiment 6 does not use the excitation-light blocking members 203, 204 used in the vehicle lighting fixtures 1C, 1D according to Embodiments 4, 5 described above and thus, the structure is simple and the manufacturing cost is low by that portion.

Note that, in the vehicle lighting fixture 1E according to this Embodiment 6, the lamp housing 100 and the external-light absorbing layer 40 may be omitted. In this case, the lamp lens 103 remains intact. Moreover, in this case, a design member with a design (see the design member 4 in FIG. 6) is provided, and this design member is disposed on a side opposite to the lamp lens 103 side with respect to the reflective portion 3E.

As a result, the design member of the vehicle lighting fixture 1E according to this Embodiment 6 can achieve the working effects similar to the working effects of the design member 4 of the vehicle lighting fixture 1B according to Embodiment 3 described above. In other words, when looking at the reflective portion 3E inside the lamp lens 103 from the outside of the lamp lens 103, the design on the front side of the design member can be seen, and the rear surface side of the design member can be covered.

Note that, in the vehicle lighting fixture 1E according to this Embodiment 6, instead of the vehicle body panel P as a shielding member, the lamp lens 103 may cover the light source portion 2E together with the reflective portion 3E.

Explanation of Configuration, Actions, and Effects of Embodiment 7

Figure 12:
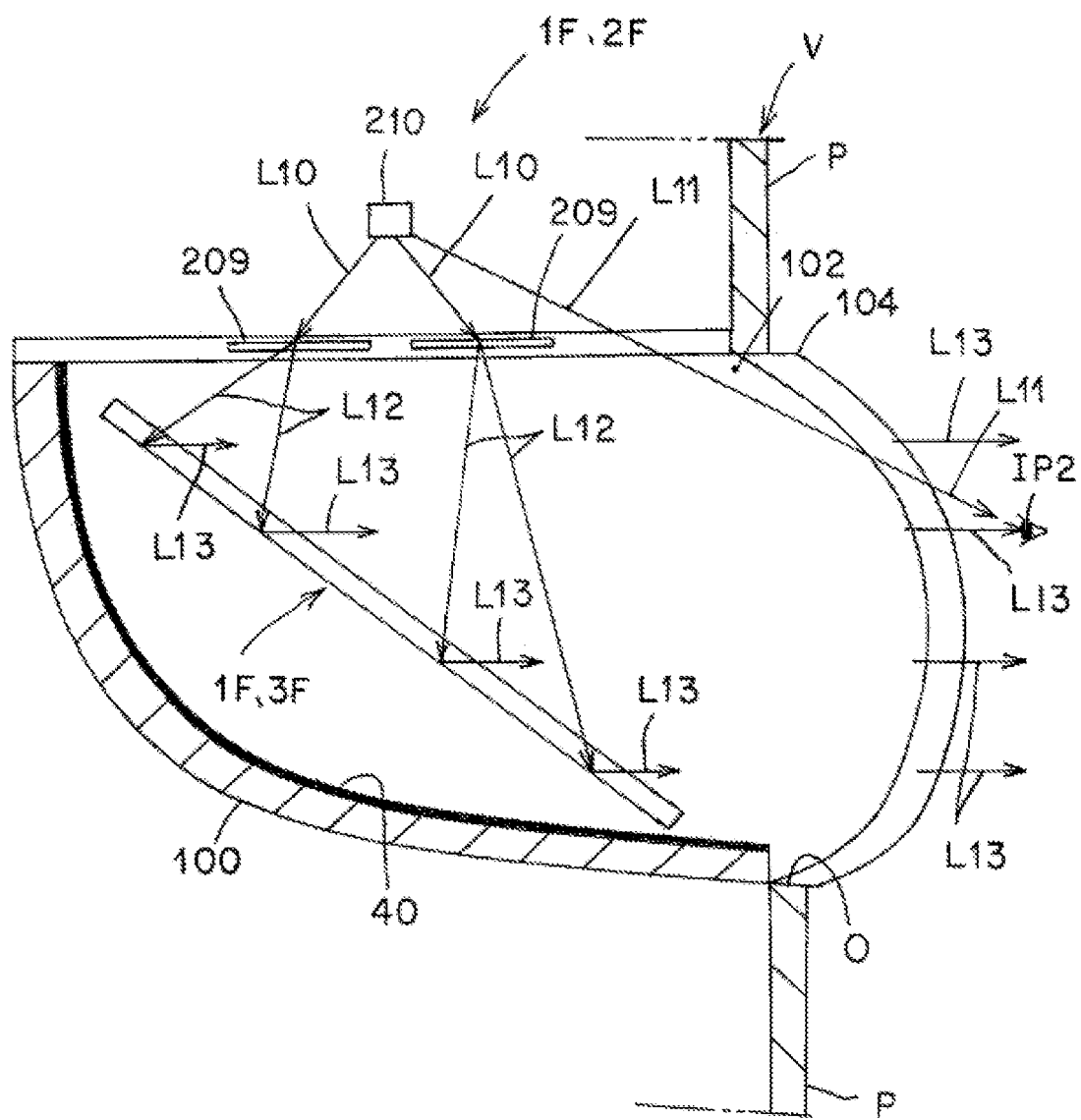

FIG. 12 illustrates Embodiment 7 of the vehicle lighting fixture according to the present invention. Hereinafter, the configuration, actions, and effects of the vehicle lighting fixture 1F according to this Embodiment 7 will be described. In the figures, the same signs as those in FIGS. 1 to 11 indicate the same components.

The vehicle lighting fixture 1F according to this Embodiment 7 is a variation of the vehicle lighting fixture E according to Embodiment 6 described above. Note that a reflective portion 3F of the vehicle lighting fixture 1F according to this Embodiment 7 has the configuration similar to that of the reflective portion 3E of the vehicle lighting fixture 1E according to Embodiment 6 described above.

The vehicle lighting fixture 1E according to Embodiment 6 described above uses the light source portion 2E having the light conversion member 201 and the light emitting layer 202 (design part 202) as the light source portion 2E and uses the lamp lens 103 constituted by a red transparent member as the lamp lens 103.

In contrast, the vehicle lighting fixture 1F according to this Embodiment 7 uses the light source portion 2F having one or a plurality of light sources 210 (red LEDs 210 or red LDs (semiconductor laser) or the like in this example) which emit light L10 (red light L10 in this example) as the light source portion 2F and an optical substrate 208 and uses the lamp lens 104 constituted by a colorless transparent material as the lamp lens 104.

The optical substrate 208 is disposed between the light source 210 and the reflective portion 3F and is optically designed. The optical substrate 208 has a design part 209 which designs a design of light L11 (red light L11) emitted to the outside provided. The design part 209 is provided on a part of the optical substrate 208 in this example. Note that the design part 209 may be provided on the whole of the optical substrate 208. The design part 209 is constituted by a diffusion surface.

As a result, the vehicle lighting fixture 1F according to this Embodiment 7 can achieve the working effect similar to those of the vehicle lighting fixtures 1C to 1E according to Embodiments 4 to 6 described above.

Explanation of Configuration, Actions, and Effects of Embodiment 8

Figure 13:
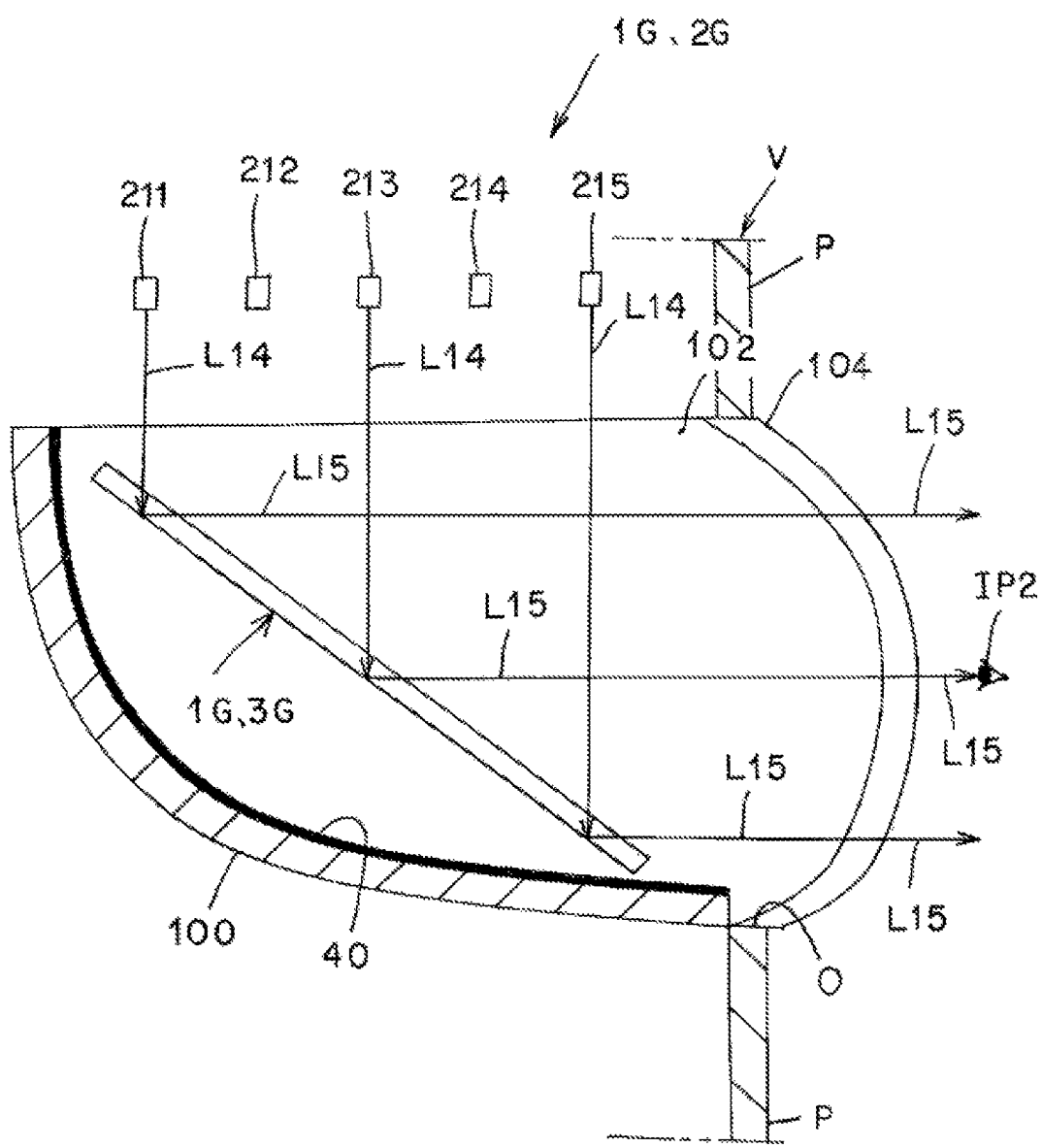

FIG. 13 illustrates Embodiment 8 of the vehicle lighting fixture according to the present invention. Hereinafter, the configuration, actions, and effects of the vehicle lighting fixture 1G according to this Embodiment 8 will be described. In the figures, the same signs as those in FIGS. 1 to 12 indicate the same components.

The vehicle lighting fixture 1G according to this Embodiment 8 is a variation of the vehicle lighting fixtures 1E, 1F according to Embodiments 6, 7 described above. Note that a reflective portion 3G of the vehicle lighting fixture 1G according to this Embodiment 8 has the configuration similar to those of the reflective portions 3E, 3F of the vehicle lighting fixtures 1E, 1F according to Embodiment 6, 7 described above.

The vehicle lighting fixture 1G according to this Embodiment 8 has, as light source portion 2G, a plurality of light sources or five light sources 211, 212, 213, 214, 215 (hereinafter indicated as "211 to 215") in this example. The plurality of light sources 211 to 215 are configured to be controllable to be turned on/off, respectively, via a control portion (not shown).

The light source portion 2G of the vehicle lighting fixture 1G according to this Embodiment 8 can be used as the light source portions 2A to 2F of the vehicle lighting fixtures 1A to 1F according to Embodiments 1 to 7 described above.

The vehicle lighting fixture 1G according to Embodiment 8 can achieve the working effect similar to those of the vehicle lighting fixtures 1C to 1F according to Embodiments 4 to 7 described above. In particular, the vehicle lighting fixture 1F according to this Embodiment 8 has a plurality of light sources 211 to 215 of the light source portion 2 to be controllable to be turned on/off, respectively, so that dynamic light emitting surfaces and light distribution can be obtained. Moreover, the reflective portion 3G has a display function.

Explanation of Examples Other than Embodiments 1 to 8

Note that, in the aforementioned Embodiments 1 to 8, any one of the tail lamps, stop lamps or tail/stop lamps constituting a rear combination lamp is described. However, the present invention can be applied to vehicle lighting fixtures other than the aforementioned lamps and displays. Examples include turn signal lamps at the rear of the vehicle, rear fog lamps, and backup lamps.

In the aforementioned Embodiments 1 to 8, rear combination lamps equipped at the rear part of a vehicle are described. However, the present invention can also be applied to front combination lamps, interior lamps, instrument lamps, decorative lamps, displays and the like, which are equipped at the front part of a vehicle other than the rear combination lamps, which are equipped at the rear part of a vehicle. The front combination lamps include headlamps, fog lamps, day running lamps, clearance lamp turn signal lamps and the like.

Furthermore, in the aforementioned Embodiments 1 to 8, the light source portions 2 to 2G are mounted on the ceiling part of the vehicle body panel P. However, in the present invention, the light source portions 2 to 2G may be mounted on the both left and right sides of the vehicle body panel P, as indicated by the two dot chain lines in FIGS. 1 and 2. In this case, the relative positions of the light source portions 2 to 2G and the reflective portions 3 to 3G change from up-down as shown in FIGS. 3 and 4 to left-right.

Note that the present invention is not limited by the aforementioned Embodiments 1 to 8.

DESCRIPTION OF REFERENCE NUMERALS 1, 1A, 1B, 1C, 1D, 1E, 1F, 1G Vehicle lighting fixture
10, 100 Lamp housing
11, 101, 103, 104 Lamp lens
12, 102 Light chamber
2, 2A, 2B, 2C, 2D, 2E, 2F, 2G Light source portion
20, 210, 211, 212, 213, 214, 215 Light source
200 Excitation light source
21 Optical substrate
22 Circuit board
23 Support member
24 Design part
201 Light conversion member
202 Light emitting layer (design part)
203, 204 Excitation-light blocking member
205 Transmissive part
206 Non-transmissive part
207 Support member
208 Optical substrate
209 Design part
3, 3A, 3B, 3C, 3D, 3E, 3F, 3G Reflective portion
30A Light transmissive part
4 Design member
40 External-light absorbing layer
G Window glass
H Person
IP1 Eye point of person H in cabin R
IP2 Eye point from outside
L1 Light (from light source portion 2)
L2 Light (from light source 20)
L3, L9, L13, L15 Emitted light (reflected light)
L4 External light (line of sight from eye point IP2 outside cabin R)
L5 Line of sight from eye point IP1 of person H in cabin R
L6 Excitation light
L7 Excitation light (excitation light not passing through light emitting layer 202)
L8 Light (from light source portion 2D)
L10 Light (from light source 210)
L11 Light (light not passing through design part 209)
L12 Light (from light source portion 2F)
L14 Light (light from light source portion 2G, light from light sources 211, 213, 215)
P Vehicle body panel (shielding member)
P1 Decorative ceiling panel
O Opening
R Cabin
V Vehicle

The invention claimed is:

1. A vehicle lighting fixture comprising:
   an excitation light source which emits excitation light;
   a light emitting layer which generates photoluminescence by the excitation light emitted from the excitation light source;
   a lamp lens; and
   a reflective portion which is directed to the light emitting layer and an inside of the lamp lens, respectively, and reflects the photoluminescence from the light emitting layer, transmits the photoluminescence through the lamp lens, and emits the photoluminescence to outside the lamp lens, wherein
   the lamp lens is constituted by a member which absorbs the excitation light, and
   the reflective portion is disposed with an angle of inclination, at which the reflective portion reflects the photoluminescence and transmits external light.

2. The vehicle lighting fixture according to claim 1, wherein
   a design part is provided in the light emitting layer.

3. The vehicle lighting fixture according to claim 1, wherein
   the excitation light sources are provided in plural; and
   each of the plurality of excitation light sources can be controlled to be turned on/off.

4. The vehicle lighting fixture according to claim 1, comprising
   a design member with a design, wherein
   the design member is disposed on a side opposite to a lamp lens side with respect to the reflective portion.

* * * * *